(12) United States Patent
Wang

(10) Patent No.: US 11,355,013 B2
(45) Date of Patent: Jun. 7, 2022

(54) APPARATUS AND METHOD FOR TRANSMITTING VEHICLE INFORMATION

(71) Applicant: SZ DJI TECHNOLOGY CO., LTD., Shenzhen (CN)

(72) Inventor: Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/091,117

(22) Filed: Nov. 6, 2020

(65) Prior Publication Data

US 2021/0056846 A1 Feb. 25, 2021

Related U.S. Application Data

(63) Continuation of application No. PCT/CN2019/076499, filed on Feb. 28, 2019.

(51) Int. Cl.
*G08G 1/00* (2006.01)
*G08G 1/0967* (2006.01)
*H04W 4/46* (2018.01)
*G08G 1/09* (2006.01)
(Continued)

(52) U.S. Cl.
CPC ....... *G08G 1/096791* (2013.01); *G08G 1/091* (2013.01); *G08G 1/0965* (2013.01); *H04L 67/12* (2013.01); *H04W 4/46* (2018.02)

(58) Field of Classification Search
CPC ............ G08G 1/096791; G08G 1/091; G08G 1/0965; G08G 1/162; G08G 1/093; G08G 1/096725; G08G 1/096741; H04W 4/46; H04W 4/027; H04W 4/80; H04W 4/02; H04W 4/40; H04L 67/12; G06N 3/08; G06N 3/0454; B60Q 2900/30
See application file for complete search history.

(56) References Cited

U.S. PATENT DOCUMENTS 10,134,278 B1 11/2018 Konrardy et al.
10,490,072 B2 * 11/2019 Makke ............ G08G 1/096791
2005/0073430 A1 4/2005 Kusters et al.
(Continued)

FOREIGN PATENT DOCUMENTS

CN 106347212 A 1/2017
CN 108572645 A 9/2018
WO WO 2014044632 A1 3/2014

OTHER PUBLICATIONS

International Search Report and Written Opinion of the International Searching Authority directed to related International Patent Application No. PCT/CN2019/076499, dated Nov. 26, 2019; 9 pages.

(Continued)

*Primary Examiner* — Toan N Pham
(74) *Attorney, Agent, or Firm* — Sterne, Kessler, Goldstein & Fox P.L.L.C.

(57) ABSTRACT

Methods and systems are provided for generating a signal based on the information of the information system and transmitting/broadcasting the signal to the other vehicle. For example, a method includes receiving, by a processor, an indication that an information system of a vehicle is activated and in response to receiving the indication, generating, by the processor, a signal based on the activated information system of the vehicle. The method further includes broadcasting the signal.

20 Claims, 11 Drawing Sheets

(51) Int. Cl.
G08G 1/0965 (2006.01)
H04L 67/12 (2022.01)

(56) References Cited

U.S. PATENT DOCUMENTS

| | | | |
|---|---|---|---|
| 2006/0119489 A1 | 6/2006 | Shinada et al. | |
| 2007/0162550 A1* | 7/2007 | Rosenberg | H04L 51/04 |
| | | | 709/206 |
| 2014/0070980 A1* | 3/2014 | Park | G01S 19/42 |
| | | | 342/118 |
| 2015/0243167 A1 | 8/2015 | Stählin | |
| 2016/0264047 A1* | 9/2016 | Patel | B60Q 9/008 |
| 2017/0132922 A1 | 5/2017 | Gupta et al. | |
| 2018/0259975 A1 | 9/2018 | Dold | |
| 2018/0365993 A1 | 12/2018 | Makke et al. | |
| 2019/0051178 A1* | 2/2019 | Priev | G08G 1/162 |
| 2020/0257308 A1* | 8/2020 | Herman | H04W 4/80 |

OTHER PUBLICATIONS

Extended European Search Report, dated Oct. 16, 2020, for European Patent Application No. 19817927.7, 9 pages.

* cited by examiner

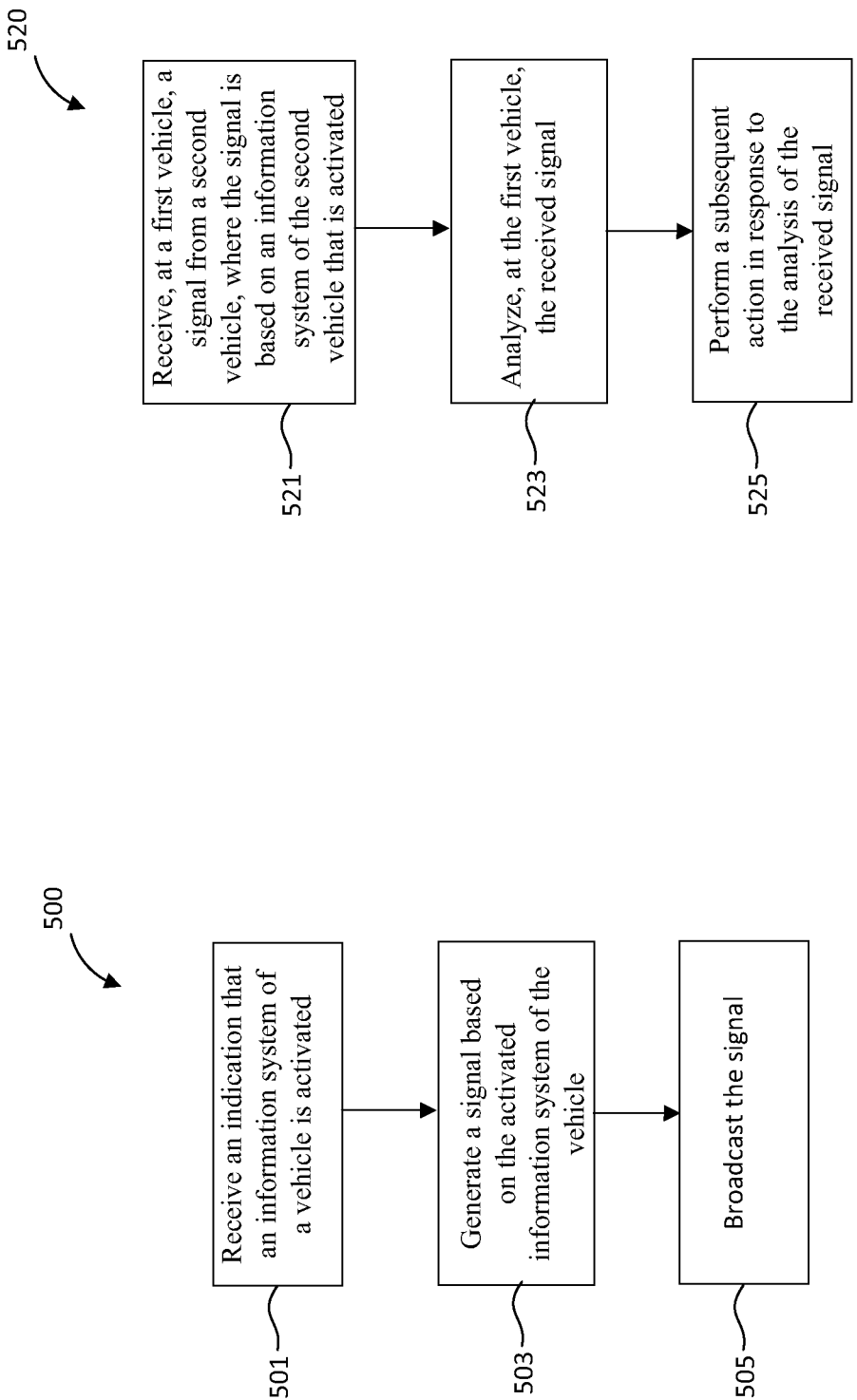

APPARATUS AND METHOD FOR TRANSMITTING VEHICLE INFORMATION

CROSS-REFERENCE TO RELATED APPLICATION

This application is a continuation of International Application No. PCT/CN2019/076499, filed on Feb. 28, 2019, which is incorporated by reference herein in its entirety.

BACKGROUND

Field

This disclosure generally relates to transmitting and receiving vehicle information.

Related Art

Research and development on self-driving vehicles or autonomous vehicles has evolved during the past years. A self-driving vehicle or an autonomous vehicle can acquire environmental information using sensors and can use the acquired information in generating decision control commands. During the evolution of the self-driving vehicle (or the autonomous vehicle), there are situations where the self-driving vehicle (or the autonomous vehicle) and a conventional vehicle appear on the road at the same time. In these situations, a driver of the conventional vehicle may use an information system of the conventional vehicle (e.g., a vehicle horn system, a vehicle brake system, a vehicle headlight system, a vehicle blinker system, a vehicle acceleration system, a vehicle turn signal system, and the like) to send vehicle information. However, a self-driving vehicle (or an autonomous vehicle), which does not have a driver or its driver is not controlling the operations of the vehicle cannot understand the vehicle information from the conventional vehicle.

SUMMARY

The described embodiments relate to methods and systems for generating a signal based on the information of an information system and transmitting/broadcasting the signal to the other vehicle(s). For example, a method includes receiving, by a processor, an indication that an information system of a vehicle is activated and in response to receiving the indication, generating, by the processor, a signal based on the activated information system of the vehicle. The method further includes broadcasting the signal.

Some embodiments relate to a system including one or more processors. The one or more processors, upon executing instructions, individually or collectively, receive an indication that an information system of a vehicle is activated and in response to receiving the indication, generate a signal based on the activated information system of the vehicle. The system further includes a transmitter to transmit/broadcast the signal.

Some embodiments relate to a vehicle including an information system configured to generate an alert signal when activated and a transmitting system. The transmitting system includes one or more processor. The one or more processors, upon executing instructions, individually or collectively, are configured to receive an indication that the information system is activated and in response to receiving the indication, generate a signal based on the activated information system of the vehicle. The alert signal is different than the signal generated based on the activated information system. The transmitting system also includes a transmitter for broadcasting the signal.

Some embodiments relate to a non-transitory computer program product including machine readable instructions. The machine readable instructions cause a programmable processing device to perform operations including receiving an indication that an information system of a vehicle is activated and in response to receiving the indication, generating a signal based on the activated information system of the vehicle. The operations further includes broadcasting the signal.

Some embodiments relate to a method including receiving, at a first vehicle, a signal from a second vehicle, where the signal is based on an information system of the second vehicle that is activated and analyzing, at the first vehicle, the received signal to perform a subsequent action in response to the received signal.

Some embodiments relate to a non-transitory computer program product including machine readable instructions. The machine readable instructions cause a programmable processing device to perform operations including receiving a signal from a second vehicle, where the signal is based on an information system of the second vehicle that is activated. The operations further include analyzing the received signal to perform a subsequent action in response to the received signal.

Some embodiments relate to a system at a first vehicle. The system includes a transceiver configured to receive a signal from a second vehicle, wherein the signal is based on an information system of the second vehicle that is activated. The system further includes one or more processors, upon executing instructions, individually or collectively, configured to analyze the received signal to perform a subsequent action in response to the received signal.

Some embodiments relate to a method including receiving, by a processor, an indication that an information system of a vehicle is activated. The information system is configured to generate a first signal that is a human recognizable signal. The method further includes, in response to receiving the indication, generating, by the processor, a second signal based on the activated information system of the vehicle. The second signal is not a human recognizable signal. The method further includes determining whether to generate the first signal based on information associated with the vehicle and broadcasting the second signal.

Some embodiments relate to a non-transitory computer program product including machine readable instructions. The machine readable instructions cause a programmable processing device to perform operations including receiving an indication that an information system of a vehicle is activated. The information system is configured to generate a first signal that is a human recognizable signal. The operations further includes, in response to receiving the indication, generating a second signal based on the activated information system of the vehicle. The second signal is not a human recognizable signal. The operations further includes determining whether to generate the first signal based on information associated with the vehicle and broadcasting the second signal.

Some embodiments relate to a vehicle including an information system configured to generate a first signal that is a human recognizable signal when activated and a transmitting system. The transmitting system includes one or more processor. The one or more processors, upon executing instructions, individually or collectively, are configured to receive an indication that the information system is activated and in response to receiving the indication, generate a second signal based on the activated information system of the vehicle. The second signal is not a human recognizable signal. The one or more processors are further configured to determine whether to generate the first signal based on information associated with the vehicle. The transmitting system also includes a transmitter for broadcasting the second signal.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 5A is a flowchart depicting an example method for generating a signal based on the information of the information system and for transmitting/broadcasting the signal, according to some embodiments.

FIG. 5B is a flowchart depicting an example method for receiving and analyzing a signal generated based on information of an information system of another vehicle, according to some embodiments.

Figure 1:
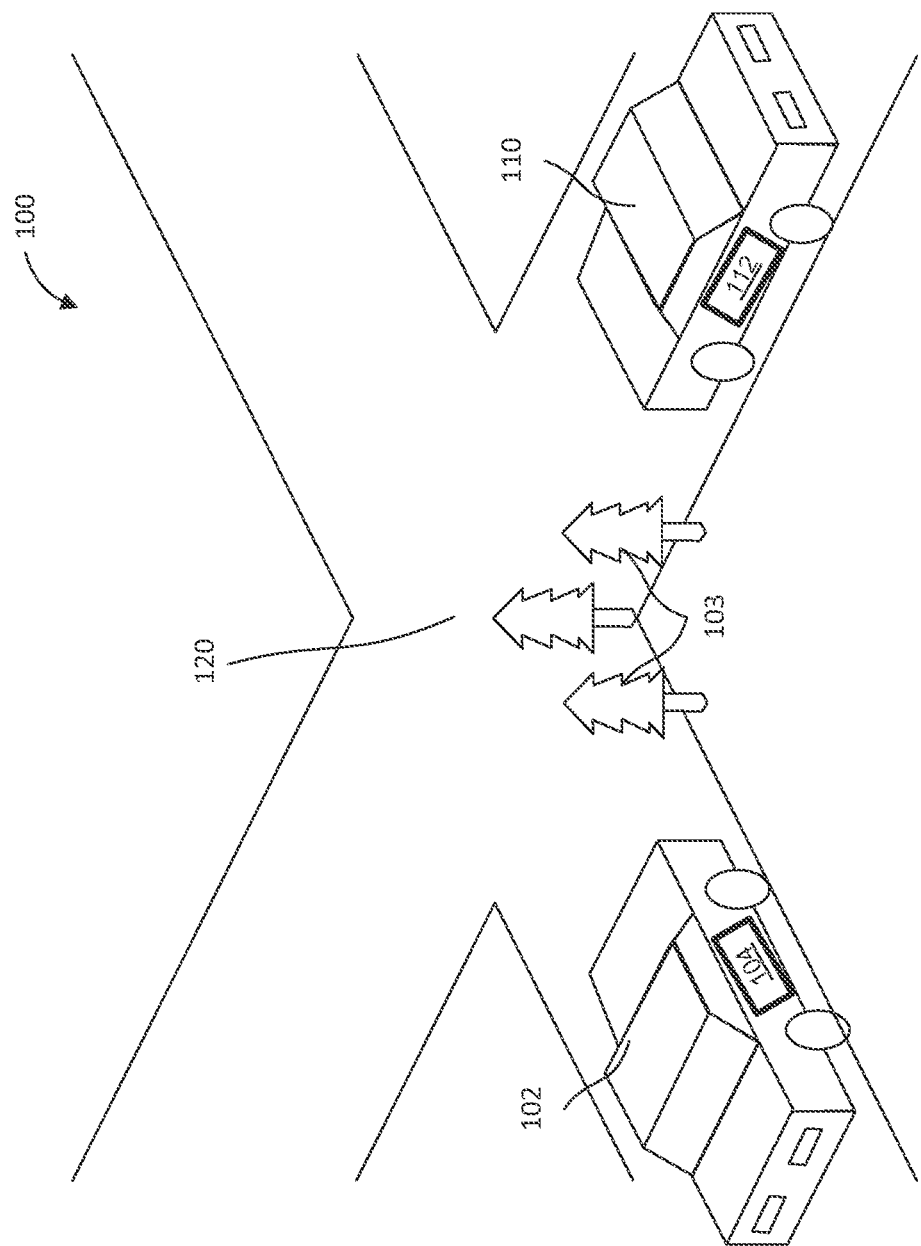
FIG. 1 is a block diagram depicting an example of a system for generating a signal based on the information of the information system, according to some embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1 is a block diagram depicting an example of a system 100 for generating a signal based on information of an information system, according to some embodiments. As illustrated in FIG. 1, system 100 can include a vehicle 102 and a vehicle 110 that can communicate with each other through a communication channel.

The vehicles 102 and 110 may be a land-bound vehicle. The vehicles 102 and 110 may travel over land. Alternatively or additionally, the vehicles 102 and 110 may be capable of traveling on or in the water, underground, in the air, and/or in space. The vehicles 102 and 110 may be an automobile. The vehicles 102 and 110 may also be a watercraft, aircraft, and/or spacecraft. The vehicles 102 and 110 may travel freely over a surface. The vehicle may travel freely within two dimensions. The vehicles 102 and 110 may primarily drive on one or more roads. As a non-limiting example, at least one of the vehicle 102 and 110 may be unmanned aerial vehicle, the first vehicle 102 can transmit its information to the second vehicle 110, and the second vehicle may do further actions according to the information. The vehicle transmits the signals by at least one of broadcasting, unicasting, multicasting.

The embodiments of this disclosure can be applied to conventional vehicles, self-driving vehicles, or autonomous vehicles. According to Society of Automotive Engineers (SAE) International, different levels of automation are defined for vehicles. For example, these definitions can divide vehicles in 5 levels including SAE Level 0, SAE Level 1, SAE Level 2, SAE Level 3, SAE Level 4, and SAE Level 5. The embodiments of this disclosure can be applied to different levels of automation.

According to some examples, the communication channel for communication between the vehicles 102 and 110 can include or be associated with wired or wireless networks such as the Internet, local area networks (LAN), wide area networks (WAN), storage area networks (SAN), point-to-point networks (P2P), WiFi networks, Bluetooth™, Bluetooth™ Low Energy, radio networks, Long-Term Evolution (LTE), 3G, 4G, 5G networks, a vehicle to vehicle communication technology, a vehicle to infrastructure communication technology, or other networks. A vehicle to infrastructure communication technology comprises the vehicle transmit information associated to the vehicle to traffic signal lights, street lamps or other infrastructures, wherein infrastructures react to the information or transmit the information to other vehicle or infrastructures. The infrastructure transmits the signals by at least one of broadcasting, unicasting, multicasting.

The first vehicle 102 may include a signal generation and transmission system 104. The signal generation and transmission system 104 could be configured to determine that an information system of the vehicle 102 is activated to generate vehicle information that is transmitted to the second vehicle 110. In some embodiments, the vehicle information is consisted of a plurality of data, wherein the data di. In some embodiment, the vehicle information includes alert information/signal. In some embodiments, the vehicle information can include warning information. The signal generation and transmission system 104 is further configured to generate a signal based on the information of the information system and transmit (e.g., broadcast) the signal to the other vehicles such as the vehicle 110.

As a non-limiting example, the vehicle 102 can be controlled by a driver when approaching the intersection 120. The driver of the vehicle 102 may activate an information system of the vehicle 102 to notify any other vehicles or stationary infrastructure that may be at or near intersection 120. For example, the driver of the vehicle 102 may recognize a vehicle 110 that is also approaching the intersection 120. In some embodiments, the driver of the vehicle 102 may not recognize vehicle 110 due to visual obstacles 103 such as trees or buildings. In the above examples, the driver of the vehicle 102 may activate an information system of the vehicle 102 to generate vehicle information (e.g., alert information/signal) to the vehicle 110. The vehicle information may be a warning signal. For example, the driver of the vehicle 102 can activate a vehicle horn system of the vehicle 102 (e.g., honk a horn) to let nearby infrastructures or vehicles such as the vehicle 110 know that the vehicle 102 is approaching the intersection. If the vehicle 110 is an autonomous or self-driving vehicle (e.g., the vehicle 110 is driving without or with minimal human interaction), the vehicle 110 may not react to the generated warning information (e.g., the sound from the vehicle horn system). In this case, the human operated vehicles could not get in communication with autonomous or self-driving vehicles, due to they deliver information in different ways.

In this exemplary embodiment, when the driver of the vehicle 102 activates the information system (e.g., the vehicle horn system), the signal generation and transmission system 104 can be configured to determine that the information system is activated to generate the warning information. In one example, the signal generation and transmission system 104 can communicate with the information system to determine when the information system is activated. The signal generation and transmission system 104 is further configured to generate a signal based on the information of the information system and transmit (e.g., broadcast) the signal to the vehicle 110. In one example, the signal generated by the signal generation and transmission system 104 can include information associated with the information system that is activated and/or information associated with the warning information. For example, the signal generated by the signal generation and transmission system 104 can indicate the intentions of the drivers of the vehicle 102 to the vehicle 110—e.g., "please pay attention, another vehicle is approaching the intersection." In this way, the vehicle transmits at least two kinds of information, the first one can be recognized by human beings, the second one can be recognized by electronic equipment.

According to some embodiments, the signal generated by the signal generation and transmission system 104 can include additional information. For example, the signal generated by the signal generation and transmission system 104 can include information associated with the environment surrounding the vehicle 102. Additionally or alternatively, the signal generated by the signal generation and transmission system 104 can include information associated with the vehicle 102. According to some embodiments, the signal generated by the signal generation and transmission system 104 can include information associated with passage information (e.g., baby in car, pregnant in car, etc.) of the vehicle 102. According to some embodiments, the additional information can include motion information (e.g., speed information, acceleration information, etc.) associated with the vehicle 102. In some embodiments, the additional information can include position information (e.g., a longitude, a latitude, or a height information, location information with a high-precision map, and the like) associated with the vehicle 102.

The additional information in the signal generated by the signal generation and transmission system 104 can be generated and/or captured using different sensor systems of the vehicle 102. The sensor systems of the vehicle 102 can include, but are not limited to, internal sensors, location sensors (e.g., global positioning system (GPS) sensors, mobile device transmitters enabling location triangulation, etc.), vision sensors (e.g., imaging devices capable of detecting visible, infrared, or ultraviolet light, such as cameras), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones), field sensors (e.g., magnetometers, electromagnetic sensors), wheel sensors, millimeter wave radar, or the like. It is noted that the embodiments of this disclosure are not limited to these sensors, and any other sensor systems can be used.

According to some embodiments, the signal generation and transmission system 104 can include artificial neural network (e.g., convolutional neural network (CNN)), artificial intelligence, and/or machine learning techniques and technologies such as for generating the signal based on the information of the information system of the vehicle 102. For example, the signal generation and transmission system 104 can include a series of neural network layers receiving one or more inputs and generating one or more outputs. The input(s) and/or output(s) to/from the signal generation and transmission system 104 can include information associated with one or more vehicles. In other words, the signal generation and transmission system 104 can be configured to receive, in addition to the information of the information system, additional information associated with the vehicle 102 and/or the environment of the vehicle 102 (e.g., speed, acceleration, position, movement, steering wheel angle, etc.) and use artificial neural network, artificial intelligence, and/or machine learning techniques and technologies to generate (and/or improve generation) of the signal to be broadcasted.

Some embodiments of this disclosure refer to an information system of a vehicle to generate vehicle information. In some embodiments, the vehicle information can include warning information (e.g., alert information/signal). The information system of the vehicle can include a vehicle horn system, a vehicle brake system, a vehicle headlight system, a vehicle blinker system, a vehicle acceleration system, a vehicle turn signal system, or the same. However, the embodiments of this disclosure are not limited to these exemplary information systems and other systems can be used to generate warning information (e.g., alert information/signal). As discussed above, the signal generated and transmitted by the signal generation and transmission system 104 can be in addition to (or alternatively to) the warning information (e.g., alert information/signal) generated by the information system of the vehicle 102. According to some embodiments, when a driver or the self-driving system of the vehicle 102 activate the vehicle brake system, the information that vehicle would make a brake is generated and transmitted by the signal generation and transmission system 104.

Also, although some examples of the information system are discussed in this disclosure that generate warning information (e.g., alert information/signal), the embodiments of this disclosure are not limited to these exemplary information systems. The signal generation and transmission system 104 of the vehicle 102 can be communicatively coupled, wirelessly or non-wirelessly, to any system within the vehicle 102. The signal generation and transmission system 104 can receive information from the systems within the vehicle 102 and can generate a signal to be transmitted/broadcasted based on the received information. The received information can include any updated information from the systems within the vehicle 102, according to some embodiments. The information can be updated by at least one of a driver of the vehicle 102 or a driving system of the vehicle 102.

According to some embodiments, the signal generation and transmission system 104 can be configured to continuously generate and broadcast the signal. For example, the signal generation and transmission system 104 may continuously receive information from one or more systems within the vehicle 102, continuously generate the signal based on the received information, and continuously broadcast the generated signal. In some embodiments, continuous generation and broadcast of the signal can include generating and broadcasting the signal periodically. The period for generating and broadcasting the signal can be determined based on a driver's profile, a passenger's profile, the vehicle's specification, the vehicle's state information, the environment information, and the like. The one or more systems within the vehicle can include, but are not limited to, vehicle acceleration measurement system, vehicle speed measurement system, vehicle position measurement system, vehicle brake system, vehicle turn signal system, vehicle light system, vehicle blinker system, vehicle headlight system, vehicle horn system and the like.

Continuing with the example above, the second vehicle 110 can include a receiving and analysis system 112 configured to receive the signal generated and transmitted by the signal generation and transmission system 104 of the first vehicle. Furthermore, the receiving and analysis system 112 can be configured to receive the signal from the signal generation and transmission system 104 and analyze the signal. As discussed above, the received signal can include information associated with the vehicle information (in some embodiments, the vehicle information can include warning information) and/or the information system of the vehicle 102. Additionally, the received signal can include additional information associated with the vehicle 102 and/or the environment of the vehicle 102. According to some embodiments, the receiving and analysis system 112 can use the received signal to make corresponding decision(s) based on the received signal. In some embodiments, a controller of the vehicle 110 can use the analysis from the receiving and analysis system 112 with (or without) additional information from one or more sensor systems of the vehicle 110 to determine subsequent action(s) to be taken for the vehicle 110.

For example, the receiving and analysis system 112 can determine that another vehicle (e.g., the vehicle 102) is approaching the intersection 120 by analysis the received signal. Using the determined analysis, the driving system of the vehicle 110 can stop or slow down the vehicle 110. Additionally or alternatively, the receiving and analysis system 112 can convert the received signal to warning information (e.g., alert information/signal) and deliver the warning information to a controller (e.g., a driving system) of the vehicle 110. In some embodiments, the vehicle 110 can have a driver, and the receiving and analysis system 112 can be configured to deliver the warning information to the driver of the vehicle 110 (e.g., using a display in the vehicle 110, using a sound system in the vehicle 110, etc.) In some embodiments, the receiving and analysis system 112 can calculate the geographic position of the first vehicle 102 by the position information and motion information taken by the received signal.

As a non-limiting example, the receiving and analysis system 112 of the vehicle 110 receives the signal from the vehicle 102. The receiving and analysis system 112 can be configured to analyze the received signal to determine the information associated with the signal. Additionally, the receiving and analysis system 112 can use additional information of the received signal to determine, for example, the position, the speed, and the direction of the vehicle 102. Further, the receiving and analysis system 112 can use the sensor system(s) of the vehicle 110 to determine the position, the speed, and the direction of the vehicle 110. Also, the receiving and analysis system 112 can access and use map information of the self-driving system (e.g., high-precision map information). Using these information, the receiving and analysis system 112 can determine that both vehicles 102 and 110 are heading to the intersection 120. The receiving and analysis system 112 can send instructions to a controller (e.g., a driving system) of the vehicle 110 to, for example, stop or slow down the vehicle 110.

According to some embodiments, the receiving and analysis system 112 can include artificial neural network (e.g., convolutional neural network (CNN)), artificial intelligence, and/or machine learning techniques and technologies such as for analyzing the received signal. For example, the receiving and analysis system 112 can include a series of neural network layers receiving one or more inputs and generating one or more outputs. The input(s) and/or output(s) to/from the receiving and analysis system 112 can include information associated with one or more vehicles. In other words, the receiving and analysis system 112 can be configured to receive the signal from the vehicle 102, in addition to additional information associated with the vehicle 102 and/or vehicle 110 and/or the environment of the vehicle 102 and/or vehicle 110 and use artificial neural network, artificial intelligence, and/or machine learning techniques and technologies to analyze the received signal. For example, additional information can be a braking signal of a vehicle that is in front of the vehicle that receives the braking signal, and the signal is taken as an additional input to the CNN, and the CNN would output a braking control signal according to the inputs. That would be useful in complex driving situations, for example, when there are several vehicles in a queue and the others vehicles could not get the information that the front vehicle make a brake. And the information would be useful supplement to the visual sensors of the vehicle.

According to some embodiments, the receiving and analysis system 112 can be configured to continuously receive and analyze the signal. For example, the receiving and analysis system 112 may continuously receive information from the vehicle 102, continuously analyze the receive signal, and continuously generate command(s) to one or more systems within the vehicle 110 based on the analyzed signal. In some embodiments, continuous reception and analysis of the signal can include receiving and analyzing the signal periodically. The period for receiving and analyzing the signal can be determined based on the period of generation and broadcast of the signal by the vehicle 102, a driver's profile, a passenger's profile, the vehicle's specification, the vehicle's state information, the environment information, and the like. The vehicle 110 can get the position of the vehicle 102, and refresh the position of vehicle 102 in the high-precision map continuously or periodically. High-precision map is a kind of electronic map with centimetre-level or higher precision, additional traffic information and semantic of map's elements (eg., lane, road, tree).

It is noted each one of the vehicles 102 or 110 can include the receiving and analysis system 112 and/or the signal generation and transmission system 104. It is also noted each one of the vehicle 102 or 110 can generate and transmit at least two different types of signals for conveying or indicating the same information/alert, the first signal is human recognizable (e.g., audio/visual signals for other drivers) and the second signal that is machine recognizable (e.g., for an autonomous vehicle).The transmission transmit the signals by at least one of broadcasting, unicasting, multicasting.

Figure 2:
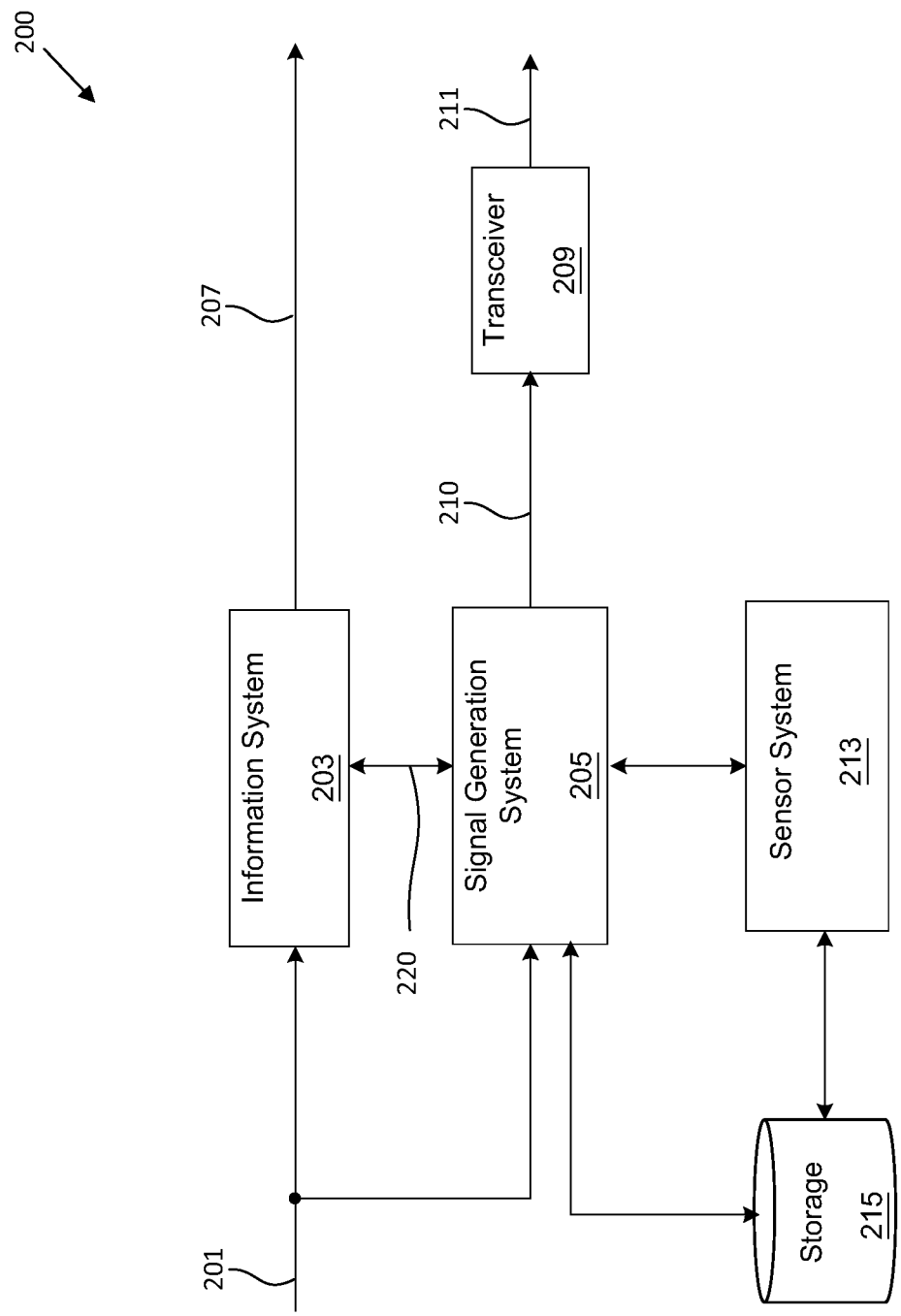
FIG. 2 is a block diagram depicting an example of a system for generating a signal based on the information of the information system and for transmitting/broadcasting the signal, according to some embodiments.

FIG. 2 is a block diagram depicting an example of a system 200 for generating a signal based on the information of the information system and for transmitting/broadcasting the signal, according to some embodiments. For example, system 200 can be part of or be associated with the vehicle 102 of FIG. 1.

As illustrated in FIG. 2, the system 200 can include information system 203, signal generation system 205, transceiver 209, sensor system 213, data storage(not shown). According to some embodiments, the signal generation system 205 and the transceiver 209 can be part of or be associated with the signal generation and transmission system 104 of FIG. 1. As discussed in more detail below, system 200 is configured to, for example, to determine that the information system 203 is activated to generate information (such as but not limited to warning information). The system 200 is further configured to generate a signal 210 based on the information of the information system and transmit (e.g., broadcast) the signal 211 to the other vehicle(s).

According to some embodiments, the information system 203 is activated using a signal 201. The signal 201 can be generated automatically using, for example, a controller (e.g., a driving system—not shown) of a vehicle. Additionally or alternatively, the signal 201 can be generated by a driver of the vehicle. For example, signal 201 is generated when the driver of the vehicle activates the information system 203. As discussed above, the information system 203 can include a vehicle horn system, a vehicle brake system, a vehicle headlight system, a vehicle blinker system, a vehicle acceleration system, a vehicle turn signal system, or the like. There may be a plurality of ways to convey the same information, the vehicle may be configured to select some (e.g., 2) of the ways depending on the kind of information the user want to convey, car's current state, environment information, user preferences, etc. For example, if it's at night and in a residential neighborhood, the car may not use a horn. The embodiments of this disclosure are not limited to these exemplary information systems and other systems within the vehicle can be considered as the information system.

In some embodiments, when the information system 203 is activated, warning information 207 (e.g., alert information/signal) is generated. According to some examples, the warning information 207 can be communicated to other vehicles. For example, when a vehicle horn system (an example of the information system 203) is activated, the warning information 207 can include the sound of the vehicle horn system communicated to other vehicles. As another example, when a vehicle blinker system (another example of the information system 203) is activated, the warning information 207 can include the light from the turn signal lights of the vehicle communicated to the other vehicles. The light from the turn signal lights can indicate, for example, the vehicle is trying to pass another vehicle, the vehicle is turning at an intersection, or the vehicle is making an emergency stop, or the like. As a further example, when a vehicle turn signal system (another example of the information system 203) is activated, the warning information 207 can include the light from the turn signal light of the vehicle communicated to the other vehicles. The light from the turn signal light can indicate, for example, the vehicle is making a turn, moving to another lane on the road, parking, and the like. As another example, when a vehicle brake system (another example of the information system 203) is activated, the warning information 207 can include the light from the brake light of the vehicle communicated to the other vehicles. The light from the brake light can indicate, for example, the vehicle is braking. According to some embodiments, the warning information 207 can include information and signals that are recognizable by a human—e.g., sound, light, etc. When a second vehicle received the information transmitted by the first vehicle, the information may be processed by the autonomous or assistant driving system. The driving system may decide, according to at least one of the motion information of the first vehicle, position information of the first vehicle, environment information, traffic information, to slow down or make a stop, and generate a feedback signal to tell the first vehicle the further action of the second vehicle. Additionally or alternatively, the feedback signal may be transmitted to infrastructures too, the traffic infrastructure could generate a final decision, according to multi-informations to direct the traffic flow and told the first vehicle and second vehicle how to pass the intersection. Additionally or alternatively, the first vehicle and second vehicle have the same profile to judge the priorities to pass the intersection.

In addition to, or in alternative to, the warning information 207, system 200 is configured to generate signal 210 and transmit signal 211, where signals 210 and 211 are based on the information system 203, information associated with the information system 203, and/or the warning information 207. According to some embodiments, the signal generation system 205 can receive signal 201, which is used to activate the information system 203. Additionally or alternatively, the signal generation system 205 can communicate 220 with the information system 203 to determine when the information system 203 is activated and/or to receive from (and/or to transmit to) the information system 203 other information. According to some embodiments, simultaneously or substantially simultaneously to the information system 203 being activated, the signal generation system 205 can generate signal 210 based on the information system 203, information associated with the information system 203, and/or the warning information 207. According to some embodiments, the signal 210 generated by the signal generation system 205 can include information associated with the information system 203 and/or information associated with the warning information 207. For example, the signal 210 can indicate the intentions of the autonomous driving system (not shown) of the vehicle and/or the driver of the vehicle for activating the information system 203. According to some embodiments, signal 210 and/or signal 220 can include information and signals that are not recognizable by a human. Also, although some examples of the information system 203 are discussed in this disclosure that generate warning information (e.g., alert information/signal) 207, the embodiments of this disclosure are not limited to these exemplary information systems. The signal generation system 205 can be communicatively coupled to any system within the vehicle 102. The signal generation system 205 can receive 220 information from the systems 203 within the vehicle 102 and can generate signal 201 to be transmitted/broadcasted based on the received information. The received information can include any updated information from the systems 203 within the vehicle 102, according to some embodiments. The information can be updated by at least one of a driver of the vehicle 102 or a driving system of the vehicle 102.

Additionally or alternatively, although the information system 203 can be activated, the information system 203 may not generate the warning information (e.g., alert information/signal) 207. In some embodiments, when the information system 203 is activated, a controller in the vehicle (such as the driving system of the vehicle, the signal generation system 205, or other controllers) can determine whether or not to generate the warning information (e.g., alert information/signal) 207. In other words, there may be a plurality of ways to convey same information from the vehicle to other vehicles and the signal generation system 205 can be configured to determine one or more ways to convey the information based on different conditions.

For example, the signal generation system 205 can be configured to determine the one or more ways based on the information to be conveyed, the state information of the vehicle, the environment information, the information associated with the information system 203, a profile (e.g., preferences) of a driver of the vehicle, or the like. As a non-limiting example, when the information system 203 can include a vehicle horn system. When the vehicle horn system is activated, the information generation system 205 can use, for example, environment information to determine whether to generate both warning information 207 and the signal 210. In one example, the information generation system 205 determines, based on the environment information, it is night time and the vehicle is in a no honking area (eg., residential area). Therefore, in this example, the information generation system 205 determines not to generate the warning information 207 (e.g., disable the horn system) but generates the signal 210, so that the signal is transmitted soundlessly by electromagnetic wave. In another example, the information generation system 205 determines, based on the environment information, it is day time and the vehicle is in a crowded area. Therefore, in this example, the information generation system 205 determines to generate the warning information 207 (e.g., enable horn system). The information generations system 205 generates the signal 210 and, with the information system 203, also generates the warning information 207.

Additionally or alternatively, the information generation system 205 can use, for example, information associated with one or more profiles of one or more drivers of the vehicle and/or information associated with one or more profiles of one or more passengers of the vehicle, to determine whether to generate both warning information 207 and the signal 210. In some examples, a profile of a driver of the vehicle and/or a profile of a passenger of the vehicle can be stored at the data storage. In another example, the information generation system 205 can use, for example, information associated with the information system 203, information associated with one or more other systems within the vehicle, the vehicle's state information, and the like to determine whether to generate both waning information 207 and the signal 210.

According to some embodiments, the signal generation system 205 can communicate with one or more sensor system(s) 213. For example, the signal generation system 205 can receive information associated with the state of the vehicle using the sensor system 213. Additionally or alternatively, the signal generation system 205 can receive environmental information associated with the surrounding environment of the vehicle. Using the received information from the information system 203 and/or the information from the sensor system 213, the signal generation system 205 is configured to generate signal 210. According to some embodiments, signal 210 can include additional information. For example, signal 210 can include information associated with the environment surrounding the vehicle. Additionally or alternatively, signal 210 can include information associated with the vehicle, for example, vehicle's state information.

As discussed above, the sensor system 213 can include, but are not limited to, internal sensors, location sensors (e.g., global positioning system (GPS) sensors, mobile device transmitters enabling location triangulation, etc.), vision sensors (e.g., imaging devices capable of detecting visible, infrared, or ultraviolet light, such as cameras), proximity sensors (e.g., ultrasonic sensors, lidar, time-of-movement cameras), inertial sensors (e.g., accelerometers, gyroscopes, inertial measurement units (IMUS)), altitude sensors, pressure sensors (e.g., barometers), audio sensors (e.g., microphones), field sensors (e.g., magnetometers, electromagnetic sensors), wheel sensors, millimeter wave radar, or the like.

As a non-limiting example, when the vehicle 102 is approaching the intersection 120 of FIG. 1, the vehicle horn system (as one example of the information system 203) is activated automatically or by a driver of the vehicle 102. In this example, the signal generation system 205 detects that the information system 203 is activated. For example, the signal generation system 205 receives an indication 220 from the information system 203 indicating that the information system 203 is activated. In some embodiments, the signal generation system 205 receives and/or retrieves additional information from the sensor system 213. For example, the signal generation system 205 receives and/or retrieves position information associated with the vehicle 102, speed information, acceleration information, direction information, environmental information (e.g., semantic information from vision sensor(s)), or the like. Using the received information from the sensor system 213, the signal generation system 205 can determine that the vehicle 102 is approaching the intersection 120. Further, using the activated information system 203 (e.g., the vehicle horn system), the signal generation system 205 determines that the warning information 207 is to alert other vehicles that the vehicle 102 is approaching the intersection. Accordingly, the signal generation system 205 generates the signal 210 based on this determination.

As discussed above, the signal 210 and the signal 211 can include information associated with the information system 203 and/or information associated with the warning information 207. For example, the signal 210 and the signal 211 can indicate the intentions of the driving system (not shown) of the vehicle and/or the driver of the vehicle for activating the information system 203. Additionally, the signal 210 and the signal 211 can include additional data and information. For example, the signal 210 and the signal 211 can include information associated with one or more other systems within the vehicle, the vehicle's state information, environment information, the vehicle's identification, information associated with one or more profiles of one or more drivers of the vehicle, information associated with one or more profiles of one or more passengers of the vehicle, and the like.

In some examples, a profile of a driver of the vehicle and/or a profile of a passenger of the vehicle can be stored at the data storage (not shown). These profiles can include one or more preferences of the driver or the passenger with respect to the vehicle and/or the driving requirements. These profiles can be accessed by the information system 203, the signal generation system 205, and/or the sensor system 213. According to some embodiments, the signal generation system 205 can generate the signals 210 and 211 based on the one or more profiles of one or more drivers of the vehicle and/or the one or more profiles of one or more passengers of the vehicle. For example, the signals 210 and 211 can include a subset of the vehicle's state information and/or the environment information. In this example, the signal generation system 205 selects the subset based at least on the driver profile and/or the passenger profile.

As discussed above, the signal 210 and the signal 211 can include additional information. According to some embodiments, the additional information can include environment information. For example, the signal generation system 205 can receive the environment information from the sensor system 213. In some embodiments, the signal generation system 205 can select which information within the received environment information to include in the signals 210 and 211. For example, the signal generation system 205 can select the environment information based on the information system 203 and/or warning information 207. Additionally or alternatively, the signal generation system 205 can select the environment information based on the vehicle's state information. The vehicle's state information can be collected using the sensor system 213.

As a non-limiting example, the information system 203 can be a vehicle horn system and/or a vehicle brake system. When the vehicle horn system and/or the vehicle brake system is activated, the signal generation system 205 can select pictures and/or videos captured by a camera of the vehicle facing the front of the vehicle to be included in the signals 210 and 211. In this non-limiting example, the signal generation system 205 selects the environment information to be included in the signals 210 and 211 based on the information system 203 and/or warning information 207.

As another non-limiting example, the information system 203 can be a vehicle turn signal system. When the turn signal system is activated, the signal generation system 205 can determine that the vehicle is, for example, turning to right. Therefore, the signal generation system 205 can determine the state of the vehicle. Based on this determination, the signal generation system 205 can include captured data of a lidar sensor mounted on the right front of the vehicle in the signals 210 and 211. In this non-limiting example, the signal generation system 205 selects the environment information to be included in the signals 210 and 211 based on the vehicle's state information.

According to some embodiments, system 200 can include and/or have access to map data/information (e.g., the high-precision map). The map information can be stored in the data storage in and/or be accessible by system 200. In some examples, the map information have been previously downloaded in the data storage and can be used/accessed by system 200. Additionally or alternatively, the map information may be stored off of the vehicle and system 200 can remotely access the map information.

According to some embodiments, the signal generation system 205 can include artificial neural network (e.g., convolutional neural network (CNN)), artificial intelligence, and/or machine learning techniques and technologies such as for generating the signal 210 based on the information system 203, information associated with the information system 203, and/or the warning information 207. For example, the signal generation system 205 can include a series of neural network layers receiving one or more inputs and generating one or more outputs. The signal generation system 205 can be configured to receive, in addition to the warning information 207 of the information system 203, additional information associated with the vehicle and/or the environment of the vehicle and use artificial neural network, artificial intelligence, and/or machine learning techniques and technologies to generate (and/or improve generation) of signal 210 to be broadcasted.

According to some examples, transceiver 209 can include one or more circuits to connect to and communicate on wired and/or wireless networks. For example, the transceiver 209 can include one or more circuits for connecting to and communicating on cellular networks (such as, but not limited to, 3G/4G/5G networks such as Universal Mobile Telecommunications System (UMTS), Long-Term Evolution (LTE), and the like.) Additionally or alternatively, the transceiver 209 can include one or more circuits for connecting to and communicating based on, for example, Bluetooth™ protocol, the Bluetooth™ Low Energy protocol, or the Bluetooth™ Low Energy Long Range protocol. As another example, the transceiver 209 can include one or more circuits for connecting to and communicating over WLAN networks such as, but not limited to, networks based on standards described in IEEE 802.11. Also, the transceiver 209 can include one or more circuits for connecting to and communicating based using optical communication network.

According to some embodiments, the transceiver 209 receives the signal 210 from signal generation system 205, and generates and transmits signal 211 to other vehicles. In some embodiments, transmission of signal 211 can include broadcast signal 211. The transceiver 209 can transmit (e.g., broadcast) signal 211 on a communication channel. According to some examples, the communication channel can include or be associated with wired or wireless networks such as the Internet, local area networks (LAN), wide area networks (WAN), storage area networks (SAN), point-to-point networks (P2P), WiFi networks, Bluetooth™, radio networks, Long-Term Evolution (LTE), 3G, 4G, 5G networks, a vehicle to vehicle communication technology, a vehicle to infrastructure technology, or other networks.

According to some embodiments, in addition to or alternative to transmitting signal 211 to other vehicles, transceiver 209 of the system 200 can be configured to transmit signal 211 to an infrastructure (e.g., vehicle-to-infrastructure (V2I) communication.) Then, the infrastructure (which can include one or more processing devices, servers, transceivers, and the like) can transmit the signal to other vehicles. Additionally or alternatively, information associated with the information system 203, warning information 207, sensor system 213, and/or signal 210 can be transmitted (e.g., using transceiver 209) to the infrastructure. The infrastructure can generate a signal (similar to signal 210 and/or signal 211) using the received information and transmit (e.g., broadcast) the signal to the other vehicle(s).

Figure 3:
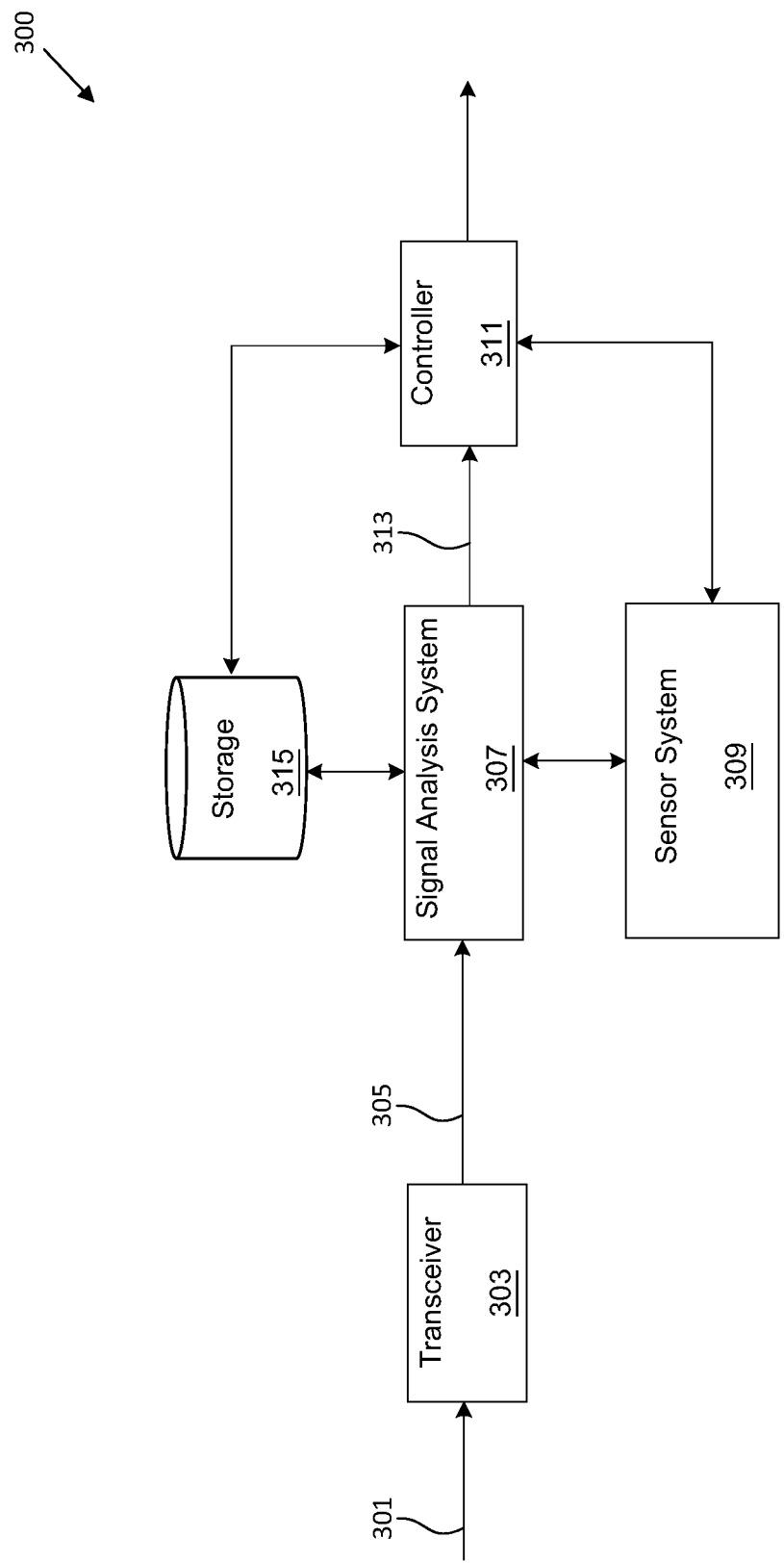
FIG. 3 is a block diagram depicting an example of a system for receiving and analyzing a signal generated based on information of an information system of another vehicle, according to some embodiments.

FIG. 3 is a block diagram depicting an example of a system 300 for receiving and analyzing a signal generated based on information of an information system of another vehicle, according to some embodiments. For example, system 300 can be part of or be associated with the vehicle 110 of FIG. 1.

As illustrated in FIG. 3, the system 300 can include transceiver 303, signal analysis system 307, sensor system 309, controller 311, data storage(not shown). According to some embodiments, the transceiver 303 and the signal analysis system 307 can be part of or be associated with the receiving and analysis system 112 of FIG. 1. As discussed in more detail below, system 300 is configured to, for example, receive a signal generated based on information of an information system of another vehicle. The system 300 is further configured to analyze the received signal and to perform subsequent action(s) in response to the received signal.

According to some embodiments, the transceiver 303 of system 300 receives signal 301. Signal 301 can be signal 211 from system 200 after it has been transmitted (e.g., broadcasted) through a communication channel. Signal 301 can represent the signal generated by system 200 of FIG. 2 based on the information system 203 and/or warning information 207. As discussed above, the received signal 301 can include information associated with the warning information 207 and/or the information system 203. Additionally, the received signal 301 can include additional information associated with the vehicle that includes system 200 and/or the environment of the vehicle that includes system 200.

According to some examples, transceiver 303 can include one or more circuits to connect to and communicate on wired and/or wireless networks. For example, the transceiver 303 can include one or more circuits for connecting to and communicating on cellular networks (such as, but not limited to, 3G/4G/5G networks such as Universal Mobile Telecommunications System (UMTS), Long-Term Evolution (LTE), and the like.) Additionally or alternatively, the transceiver 303 can include one or more circuits for connecting to and communicating based on, for example, Bluetooth™ protocol, the Bluetooth™ Low Energy protocol, or the Bluetooth™ Low Energy Long Range protocol. As another example, the transceiver 303 can include one or more circuits for connecting to and communicating over WLAN networks such as, but not limited to, networks based on standards described in IEEE 802.11. Also, the transceiver 303 can include one or more circuits for connecting to and communicating based using optical communication network.

According to some embodiments, signal 305, which is based on the received signal 301, is sent from transceiver 303 to the signal analysis system 307. The signal analysis system 307 can use signal 305 to make decision(s) based on the received signal. In some embodiments, controller 311 (e.g., a driving system) of system 300 can use the analysis from the signal analysis system 307 with (or without) additional information from one or more sensor systems 309 to determine subsequent action(s) to be taken by system 300. For example, the signal analysis system 307 alone or in combination with the controller 311 can determine, using signal 305, that another vehicle (e.g., the vehicle 102 of FIG. 1) is approaching the intersection 120 of FIG. 1. Using the determined analysis, the controller of the vehicle 110 can stop or slow down the vehicle 110. Additionally or alternatively, the signal analysis system 307 can convert signal 305 to warning information (e.g., alert information/signal) and deliver the warning information to the controller 311 (e.g., a driving system). In some embodiments, the vehicle 110 can have a driver, and the signal analysis system 307 alone or in combination with the controller 311 can be configured to deliver the warning information to the driver of the vehicle 110 (e.g., using a display in the vehicle 110, using a sound system in the vehicle 110, etc.)

According to some embodiments, the controller 311 may receive analysis 313 from the signal analysis system 307 and additional data and information from sensor system 309. The controller 311 may use the analysis 313 with (or without) the additional data and information to determine subsequent action(s). In some embodiments, the controller 311 may assign higher priority to the analysis 313 (from the signal analysis system 307) compared to the additional data/information from sensor system 309. In some embodiments, the analysis 313 can include one or more commands from the signal analysis system 307 to the controller 311 for effecting one or more subsequent actions.

As discussed above, the sensor system 309 can include, but are not limited to, internal sensors, location sensors (e.g., global positioning system (GPS) sensors, mobile device transmitters enabling location triangulation, etc.), vision sensors (e.g., imaging devices capable of detecting visible, infrared, or ultraviolet light, such as cameras), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones), field sensors (e.g., magnetometers, electromagnetic sensors), wheel sensors, millimeter wave radar, or the like.

As a non-limiting example, the signal analysis system 307 of, for example, the vehicle 110 of FIG. 1 receives signal 305 from the vehicle 102 through transceiver 303. The signal analysis system 307 can be configured to analyze signal 305 to determine the information (such as but not limited to the warning information) associated with signal 305. Additionally, the signal analysis system 307 can use additional information of signal 305 to determine, for example, the position, the speed, and the direction of the vehicle 102. Further, the signal analysis system 307 can use the sensor system(s) 309 to determine the position, the speed, and the direction of the vehicle 110. Also, the signal analysis system 307 can access and use map information (e.g., high-precision map information). Using these information, the signal analysis system 307 can determine that both vehicles 102 and 110 are heading to the intersection 120. The signal analysis system 307 can send instructions to the controller 311 to, for example, stop or slow down the vehicle 110.

According to some embodiments, the map data/information (e.g., the high-precision map) can be stored in the data storage (not shown) in and/or accessible by system 300. In some examples, the map information have been previously downloaded in the data storage and can be used/accessed by system 300. Additionally or alternatively, the map information may be stored off of the vehicle and system 300 can remotely access the map information.

According to some embodiments, high-precision maps (also called high resolution maps) can play a role for the vehicle 110 in locating the vehicle 102 (and/or vice versa) using the signal 211 transmitted/broadcasted by the vehicle 102. According to some embodiments, the high-precision map can provide a location with centimeter accuracy. Using the high-precision map, information within the signal 211, and/or information captured by sensor system 309, the signal analysis system 307 and/or the controller 311 of the vehicle 110 can be configured to locate the vehicle 102 with high accuracy. Additionally or alternatively, the signal analysis system 307 and/or the controller 311 of the vehicle 110 can be configured to determine distance, orientation, direction, and the like of the vehicle 102 in comparison to the vehicle 110 with high resolution. According to some embodiments, the high resolution can include a distance of less than 10 cm. In some examples, the high resolution can include a distance of less than 1 cm. In some examples, the high resolution can include a distance of less than 10 mm. In some examples, the high resolution can include a distance of less than 1 mm.

According to some exemplary embodiments, the high-precision map and techniques for high-accuracy localization of vehicle can use maps of urban environments. As discussed above, the high-precision map can be stored in the data storage of the vehicle 110 and/or be accessible by system 300. Additionally or alternatively, system 300 of the vehicle 110 can generate and then use the high-precision map. In some embodiments, the high-precision map can be generated using data from global positioning system (GPS), data form inertial measurement unit (IMU), real time kinematic (RTK) analysis, lidar data, information from wheel (e.g., wheel odometer), speed and acceleration data, data from one or more cameras, and the like captured by, for example, the sensor system 309. Additionally or alternatively, location data based on wireless network and/or cellular networks can also be used in generating the high-precision map.

According to some exemplary embodiments, some relaxation methods, such as but not limited to, simultaneous localization and mapping (SLAM) can be applied to generate the high-precision map. In some examples, the high-precision map can be generated and/or used as a 3 dimensional (3D) map. Additionally or alternatively, the high-precision map can be used as a 2D surface map.

After generating and/or accessing the high-precision map, the signal analysis system 307 can locate the vehicle 102 and/or the vehicle 110. According to some embodiments, the signal analysis system 307 can use the high precision map and information associated with the vehicle 102 in signal 301 to locate the vehicle 102 with high precision. The information associated with the vehicle 102 can include the vehicle 102's state information (e.g., speed, acceleration, and the like information), the environment information (e.g., location information, data from vehicle 102 camera, data from vehicle 102 lidar, data from vehicle 102, and the like), and/or information associated with the warning information 207. Additionally or alternatively, the signal analysis system 307 can use data related to the vehicle 102 captured by the sensor system 309 of the vehicle 110 with the high-precision map to locate the vehicle 102.

Additionally or alternatively, the signal analysis system 307 can use the high-precision map with the data from the sensor system 309 and/or information in the signal 301 to locate the vehicle 110 with high precision.

Figure 4A:
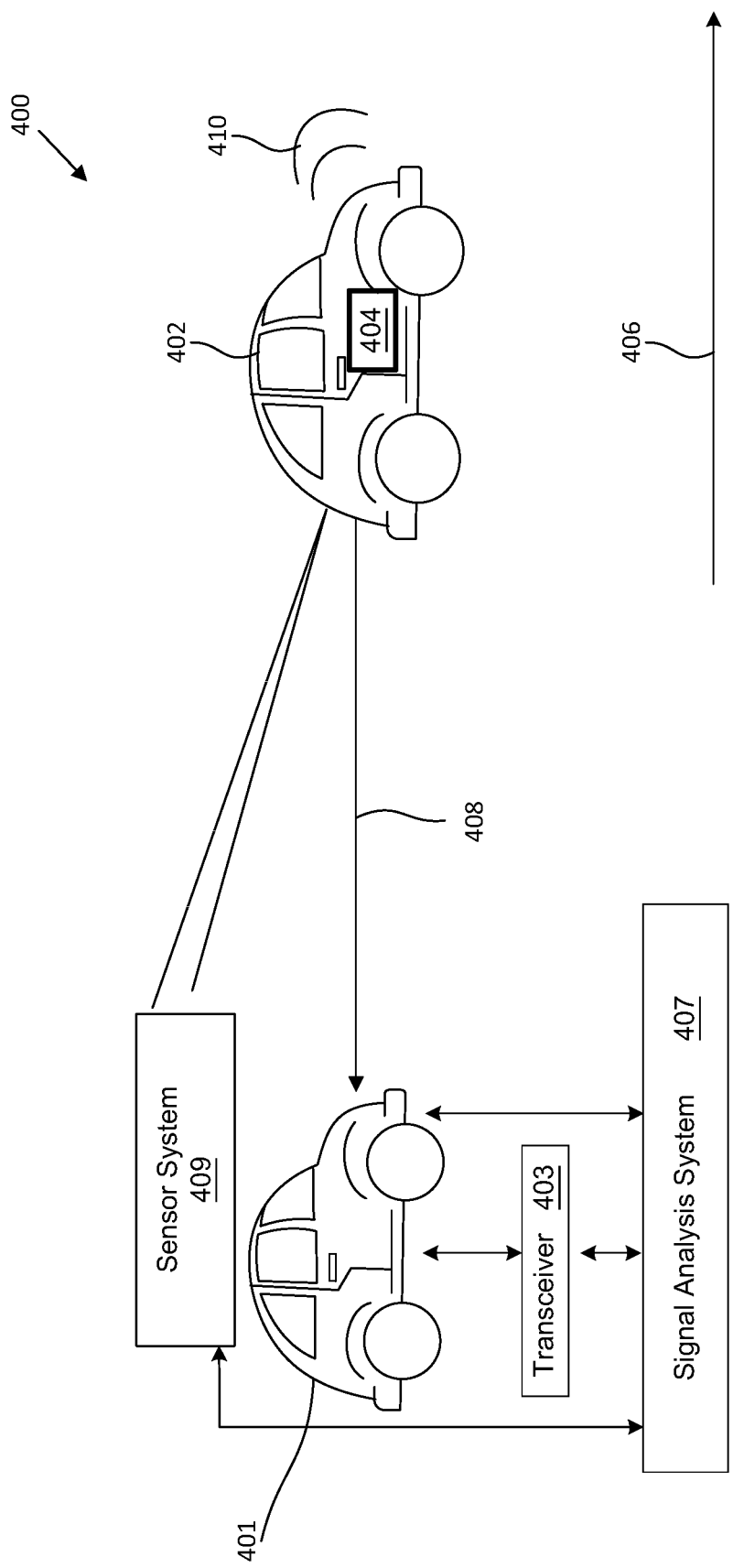
FIGS. 4A, 4B, and 4D are block diagrams depicting examples of a system for communicating a signal generated based on an information system between two vehicles, according to some embodiments.
Figure 4B:
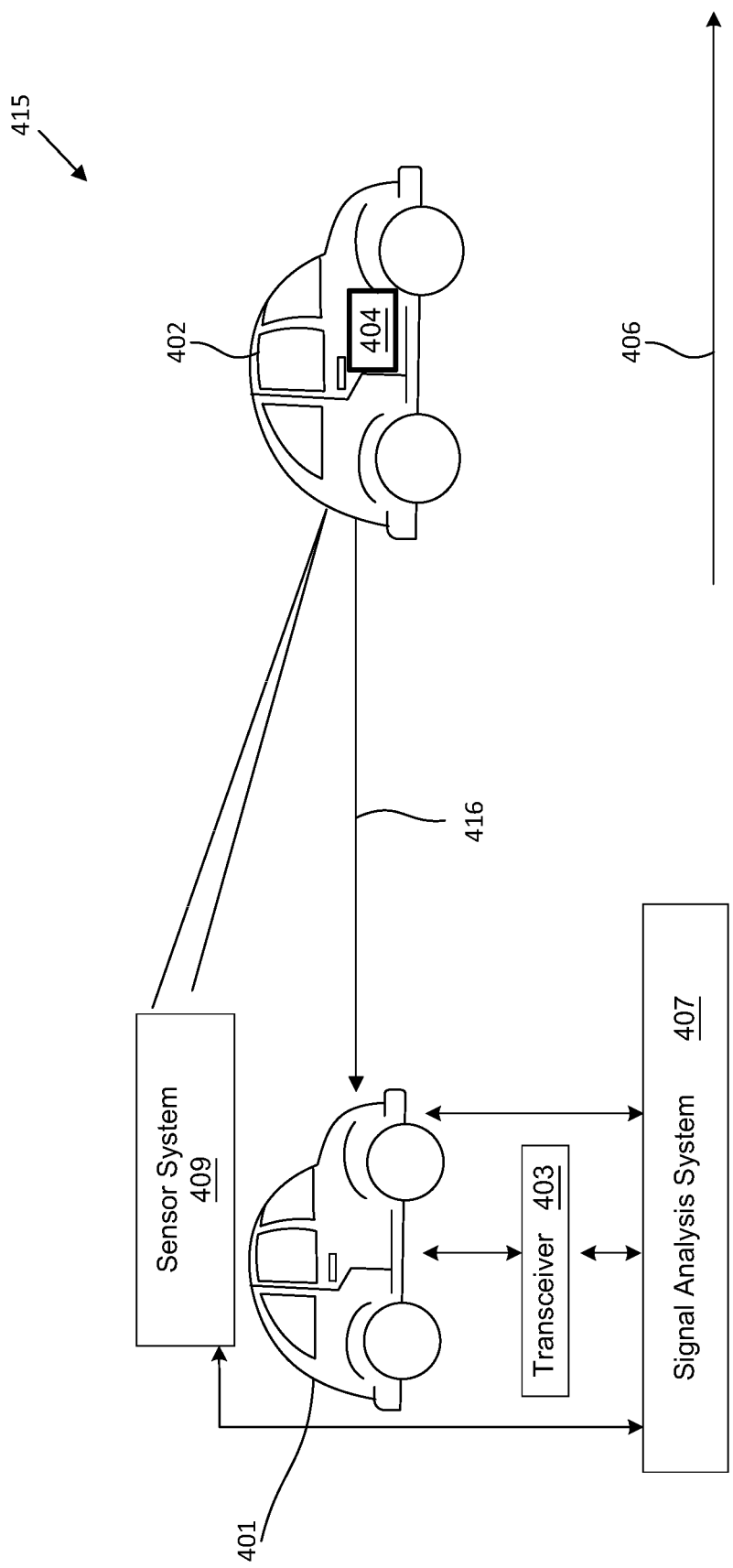
Figure 4C:
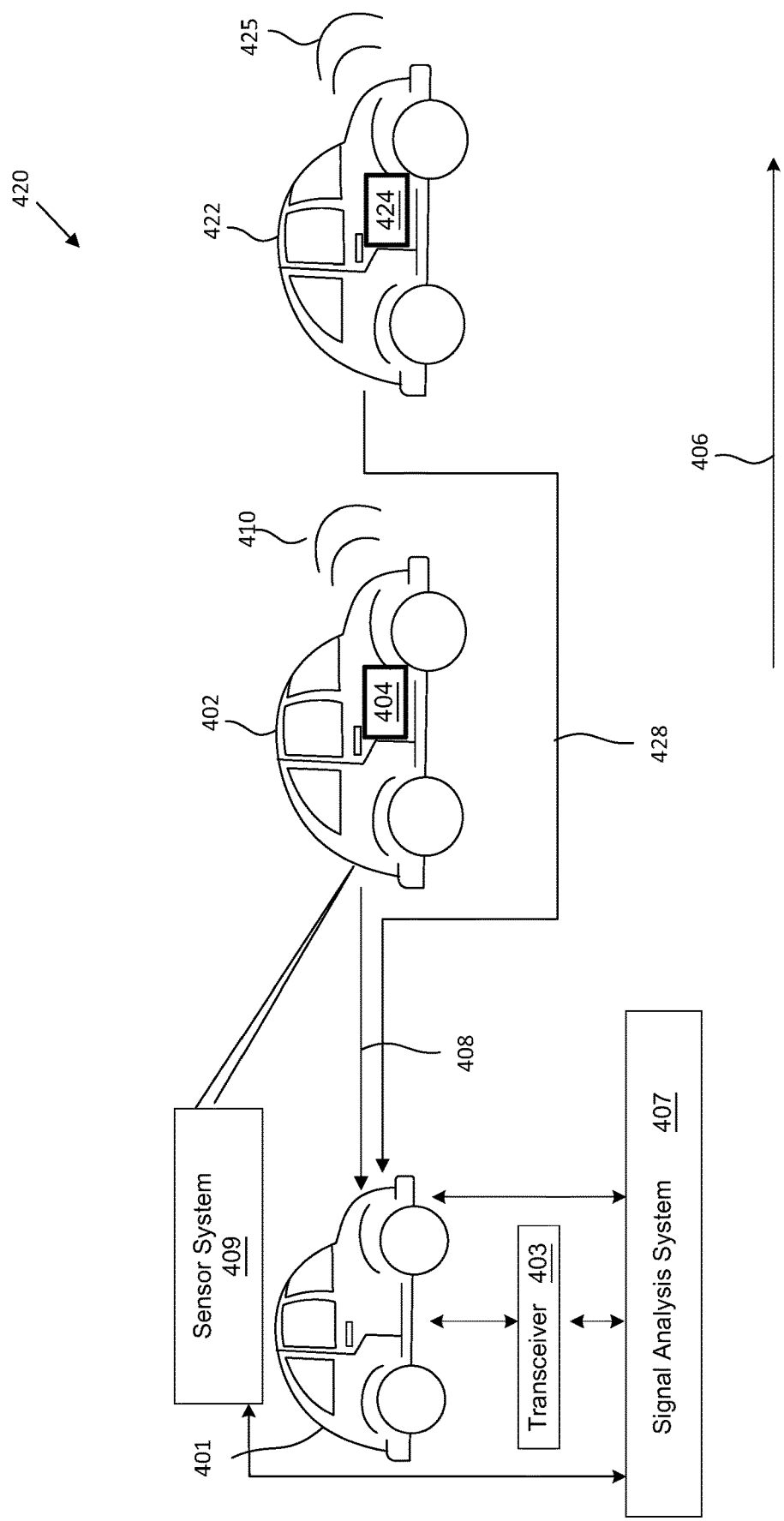
FIG. 4C is a block diagram depicting an example of a system for communicating a signal generated based on an information system between three vehicles, according to some embodiments.
Figure 4D:
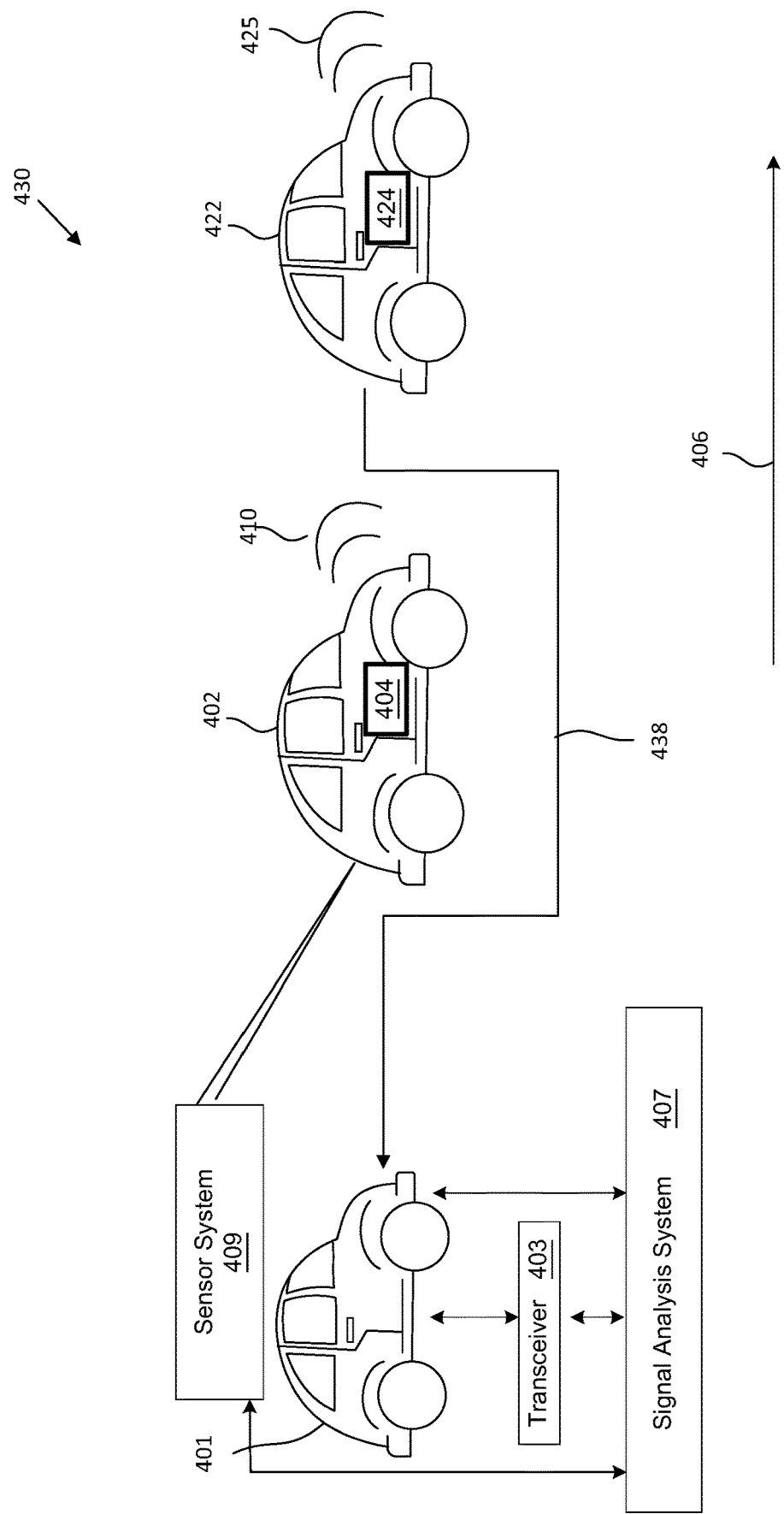
Figure 4F:
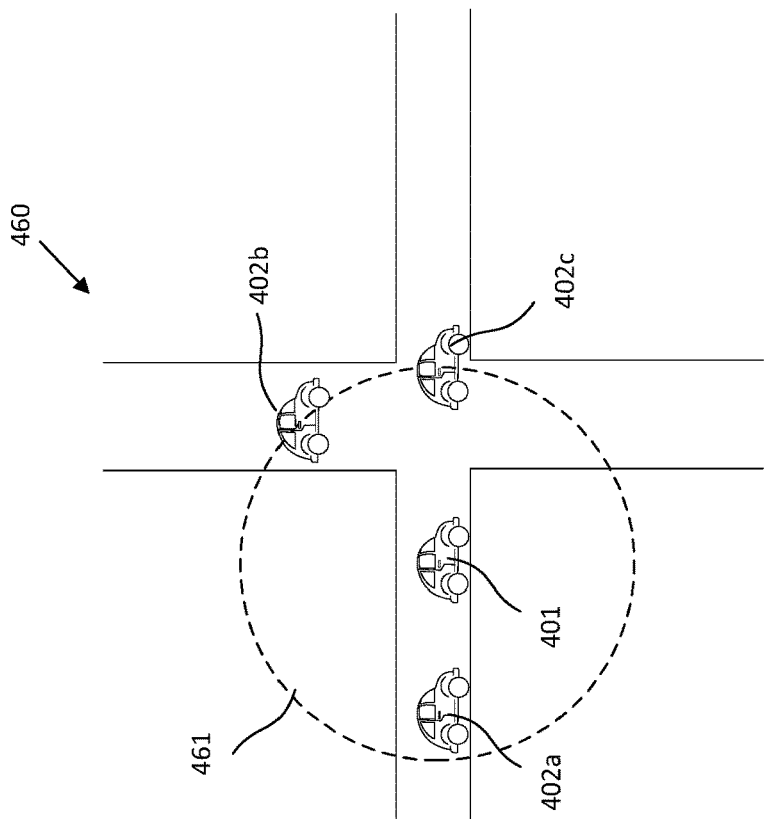
FIGS. 4E and 4F are block diagrams depicting examples of systems for locating one or more vehicles, according to some embodiments.

In a non-limiting example illustrated in FIG. 4F, the vehicle 401 can be configured to locate the nearby vehicles using the high-precision map and/or data from other vehicles. FIG. 4F is a block diagram depicting an example of a system 460 for locating one or more vehicles, according to some embodiments. The system 460 of FIG. 4F is provided as an example and does not limit the embodiments of this disclosure. In this exemplary embodiment, the vehicle 401 can be configured to locate one or more vehicles 402a-c as discussed above. In some examples, the vehicle 401 can locate the one or more vehicles 402a-c that are within area 461.

According to some embodiments, the signal analysis system 307 can use, for example, information associated with one or more profiles of one or more drivers of the vehicle and/or information associated with one or more profiles of one or more passengers of the vehicle, in analysis of the signal 305 and/or information received from sensor 309. In some examples, a profile of a driver of the vehicle and/or a profile of a passenger of the vehicle can be stored in the data storage. These profiles can include one or more preferences of the driver or the passenger with respect to the vehicle and/or the driving requirements. These profiles can be accessed by the signal analysis system 307, the controller 311, and/or the sensor system 309.

According to some embodiments, the signal analysis system 307 can generate the signal 313 based on the one or more profiles of one or more drivers of the vehicle and/or the one or more profiles of one or more passengers of the vehicle. For example, the signal 313 can include a subset of the vehicle's state information and/or the environment information. In this example, the signal analysis system 307 selects the subset based at least on the driver profile and/or the passenger profile. Additionally or alternatively, the controller 311 can perform and/or instruct for the subsequent action(s) based on based at least on the driver profile and/or the passenger profile.

According to some embodiments, the signal analysis system 307 can include artificial neural network (e.g., convolutional neural network (CNN)), artificial intelligence, and/or machine learning techniques and technologies such as for analyzing signal 305. For example, the signal analysis system 307 can include a series of neural network layers receiving one or more inputs and generating one or more outputs. The input(s) and/or output(s) to/from the signal analysis system 307 can include information associated with one or more vehicles. In other words, the signal analysis system 307 can be configured to receive signal 305, in addition to additional information associated with the vehicle 102 and/or vehicle 110 and/or the environment of the vehicle 102 and/or vehicle 110 and use artificial neural network, artificial intelligence, and/or machine learning techniques and technologies to analyze signal 305.

The embodiments of this disclosure can reduce the risk of autonomous driving caused, for example, by sensor blind spot. Additionally, the embodiments of this disclosure can provide higher reliability by providing more and better information. Also, by using artificial neural network (e.g., convolutional neural network (CNN)), artificial intelligence, and/or machine learning techniques and technologies, the computing power can be saved and better decisions can be made by the vehicles.

FIG. 4A is a block diagram depicting an example of a system 400 for communicating a signal generated based on an information system between two vehicles, according to some embodiments. The system 400 of FIG. 4A is provided as an example and does not limit the embodiments of this disclosure.

In this exemplary embodiment, vehicles 401 and 402 are traveling in direction 406. Vehicle 402 includes the signal generation and transmission system 404. The signal generation and transmission system 404 is similar to the signal generation and transmission system 104 discussed above with respect to FIG. 1. According to this exemplary embodiment, when vehicle 402, automatically (e.g., using an autonomous driving system) or by its driver, activates a vehicle horn system (not shown), warning information (e.g., alert information/signal) 410 is generated. Warning information 410 can include an alert signal such as the sound of the vehicle horn system. In addition to or alternatively to the warning information 410, the signal generation and transmission system 404 is configured to generate and transmit (e.g., broadcast) signal 408. Signal 408 is different than the warning information (e.g., alert information/signal) 410. As discussed in more detail with respect to FIGS. 1 and 2, the signal generation and transmission system 404 generates signal 408 based at least on the vehicle horn system. The signal generation and transmission system 404 can use other information associated with the vehicle 402 and/or associated with the environment of the vehicle 402 to generate signal 408. Additionally or alternatively, signal 408 can include additional information such as position information associated with the vehicle 402, speed information associated with the vehicle 402, acceleration information associated with the vehicle 402, identification of the vehicle 402, movement planning information associated with the vehicle 402 (e.g., based on L4 or L5 navigation planning), and the like. In some embodiments, the position information associated with the vehicle 402 is determined and/or is associated with a high-precision map. In some examples, the position information includes a longitude, a latitude, or a height associated with the vehicle 402.

In this exemplary embodiment, vehicle 401 receives signal 408 using, for example, transceiver 403. The transceiver 403 may be similar to the transceiver 303 discussed with respect to FIG. 3. The received signal 408 is analyzed using the signal analysis system 407. The signal analysis system 407 may be similar to the signal analysis system 307 of FIG. 3. According to some embodiments, the vehicle 401 can include sensor system 409 (similar to sensor system 309 of FIG. 3). As discussed above with respect to FIG. 3, the signal analysis system 407 can use data and information from the sensor system 409 in analyzing the received signal 408. Additionally or alternatively, the signal analysis system 407 can use information associated with the vehicle 402 and/or information associated with the vehicle 401 in analyzing the received signal 408. After analyzing the signal 408, the signal analysis system 407 can perform subsequent actions within the vehicle 401.

In this exemplary embodiment, the signal analysis system 407 can determine from the received signal 408 that the vehicle 402 has activated its horn system. In some examples, the signal 408 can include additional information, such as, but not limited to, position information of the vehicle 402, speed information of the vehicle 402, acceleration information of the vehicle 402. The position information of the vehicle 402 can be associated with a high-precision map. The signal analysis system 407 can generate an information signal for a driving system of the vehicle 401 indicating a presence of the vehicle 402 and that the vehicle 402 has activated its horn system.

Although the exemplary embodiment of FIG. 4A was discussed with respect to activating the horn system of the vehicle 402, the embodiments of this disclosure can include activation of any information system. For example, FIG. 4B is a block diagram depicting an example of a system 415 for communicating a signal generated based on an information system between two vehicles, according to some embodiments. The system 415 of FIG. 4B is provided as an example and does not limit the embodiments of this disclosure.

In the exemplary embodiment of FIG. 4B, the vehicle 402 activates, automatically (e.g., using a driving system of the vehicle 402) or by a driver of the vehicle 402, a vehicle turn signal system. The signal generation and transmission systems 404 of the vehicle 402 can determine a direction of the turn of the vehicle 402 and generate signal 416. The signal generation and transmission systems 404 can transmit (e.g., broadcast) signal 416. According to some examples, the signal generation and transmission systems 404 generate signal 416 to inform one or more vehicles that the vehicle 402 is making a turn, changing its lane on the road, parking, and the like. Signal 416 can include at least one of a turning orientation of the vehicle 402, position information of the vehicle 402, speed information of the vehicle 402, acceleration information of the vehicle 402, and the like.

By analyzing the received signal 416, the signal analyzing system 407 of the vehicle 401 can determine that the vehicle 402 is making a turn. According to some examples, the signal analyzing system 407 can determine the direction of the turn of the vehicle 402 using the received signal 416. Additionally, the signal analyzing system 407 can use additional information in signal 416 and/or from the sensor system 409 to determine the direction of the turn of the vehicle 402. For example, the signal analyzing system 407 can determine the position of the vehicles 401 and/or 402 using, for example, high-precision map, determine the distance between the two vehicles, predict the vehicle 402 action (e.g., steering, turning, parking, etc.) The signal analyzing system 407 can generate an information signal for the driving system of the vehicle 401 to inform the driving system of the vehicle 401 that the vehicle 402 is making a turn. The driving system of the vehicle 401 can use the information for subsequent action. The subsequent actions can include, but are not limited to, slowing down the vehicle 401, maneuvering the vehicle 401 to pass the vehicle 402, changing the lane that the vehicle 401 is traveling on (if possible), displaying a message to a driver of the vehicle 401 (if the vehicle 401 has a driver), and the like.

As another example, the information system of the vehicle 402 that is activated can include a vehicle brake system. The signal generation and transmission system 404 of the vehicle 402 can determine, based on the indication from the vehicle brake system, that the vehicle 402 is activating the vehicle brake system (e.g., vehicle 402 is braking). The signal generation and transmission system 404 of the vehicle 402 can generate a signal to inform one or more vehicles (e.g., the vehicle 401) that the vehicle 402 is braking. In some embodiments, the generated signal can include at least one of position information of the vehicle 402, speed information of the vehicle 402, acceleration information of the vehicle 402, and the like.

When the vehicle 401 receives the signal, the signal analysis system 407 can determine, based on the received signal, that the vehicle 402 activated a brake system. The signal analysis system 407 can generate an information signal for a driving system of the vehicle 401 indicating that the vehicle 402 is braking. The driving system of the vehicle 401 can use the information for subsequent action. The subsequent actions can include, but are not limited to, slowing down the vehicle 401, maneuvering the vehicle 401 to pass the vehicle 402, changing the lane that the vehicle 401 is traveling on (if possible), displaying a message to a driver of the vehicle 401 (if the vehicle 401 has a driver), and the like.

FIG. 4C is a block diagram depicting an example of a system 420 for communicating a signal generated based on an information system between three vehicles, according to some embodiments. The system 420 of FIG. 4C is provided as an example and does not limit the embodiments of this disclosure.

In this exemplary embodiment, vehicles 401, 402, and 422 are traveling in direction 406. Vehicles 402 and 422 include the signal generation and transmission systems 404 and 424, respectively. The signal generation and transmission systems 404 and 424 are similar to the signal generation and transmission system 104 discussed above with respect to FIG. 1. According to this exemplary embodiment, when vehicle 402, automatically (e.g., using a driving system) or by its driver, activates a vehicle horn system (not shown), warning information(e.g., alert information/signal) 410 is generated. Warning information 410 can include an alert signal such as the sound of the vehicle horn system. In addition to or alternatively to the warning information 410, the signal generation and transmission system 404 is configured to generate and transmit (e.g., broadcast) signal 408.

Similarly, when vehicle 422, automatically (e.g., using a driving system) or by its driver, activates a vehicle horn system (not shown), warning information (e.g., alert information/signal) 425 is generated. Warning information 425 can include an alert signal such as the sound of the vehicle horn system. In addition to or alternatively to the warning information 425, the signal generation and transmission system 424 is configured to generate and transmit (e.g., broadcast) signal 428. Signal 428 is different than the warning information (e.g., alert information/signal) 425.

The transceiver 403 of the vehicle 401 can receive signal 408 from the vehicle 402 and signal 428 from the vehicle 422. According to some embodiments, the vehicle 402 can also determine additional information associated with the vehicles 402 and/or 422. The additional information can include, but is not limited to, position information, speed information, acceleration information, movement planning information, and the like. The position information can be associated with a high-precision map. In some embodiments, the vehicle 402 can determine the additional information associated with the vehicles 402 and/or 422 using the sensor system 409 of the vehicle 401. Additionally or alternatively, the additional information associated with the vehicles 402 and/or 422 can be included in signals 408 and/or 428, respectively.

In this exemplary embodiment, the signal analysis system 407, by analyzing the received signal 408, can determine that the vehicle 402 has activated its horn system. The signal analysis system 407 can use the received and/or determined additional information in its determination, according to some embodiments. Additionally or alternatively, the signal analysis system 407, by analyzing the received signal 428, can determine that the vehicle 422 has activated its horn system. The signal analysis system 407 can use the received and/or determined additional information in its determination, according to some embodiments.

According to some embodiments, the vehicle 401 can use the position information associated with the vehicles 402 and 422 received with signals 408 and 428, receptively, to determine the positions of the vehicles 402 and 422. The vehicle 401 can also use its position information in determining the positions of the vehicles 402 and 422. Additionally or alternatively, the position information associated with the vehicles 402 and 422 is determined using the sensor system 409 of the vehicle 401. The vehicles 401, 402, and/or 422 can use a high-precision map in determining position location, according to some embodiments. In some examples, the position information includes a longitude, a latitude, or a height associated with the vehicles 401, 402, and/or 422.

Figure 4E:
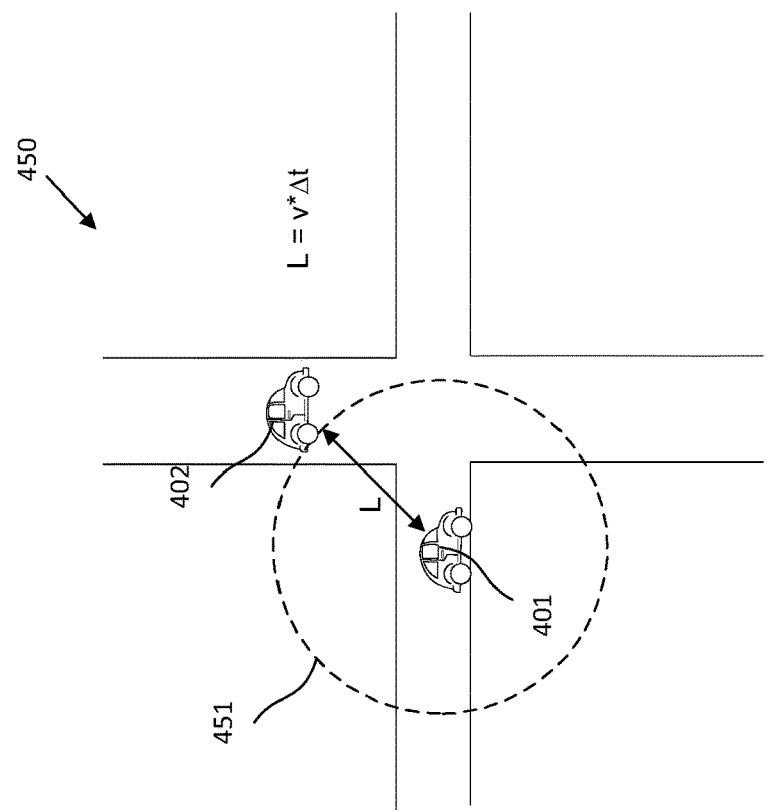

In a non-limiting example, the sensory system 409 of the vehicle 401 can include sound sensors (e.g., microphones) to receive the warning information 410 (and/or 425). In this example, the vehicle 401 can determine the position of and/or the speed of the vehicle 402 (and/or 422) based on a time difference between receiving the warning information 410 (and/or 425) and receiving signal 408 (and/or 428). For example, the vehicle 401 can determine that the vehicle 402 (and/or 422) is a located at a point along a substantially circular arc that is centered on the vehicle 401. An example of this determination is illustrated in FIG. 4E. For example, in system 450, if a time difference between receiving the warning information 410 (and/or 425—e.g., sound wave from a vehicle horn system) and receiving signal 408 (and/or 428—e.g., electromagnetic wave) is illustrated by $\Delta T$ and the velocity of the sound wave is V, then the substantially circular arc 451 centered on the vehicle 401 can have a radius of $L=V*\Delta T$. Combined with the high-precision map, the vehicle 401 can determine and verify the position of the vehicle 402 (and/or 422), thereby increasing the robustness of the process(es) performed by the vehicle 401.

According to some embodiments, the vehicle 402 can block the visual line of sight of the vehicle 401. In other words, the vehicle 401 may not have a visual line of sight of the vehicle 422. The embodiments of this disclosure can reduce the risk of autonomous driving caused, for example, when the visual line of sight of the vehicle 401 is blocked and the vehicle 422 is taking an action that can affect the vehicle 401. Additionally, the embodiments of this disclosure can provide higher reliability by providing more and better information to the vehicle 401.

Although the exemplary embodiment of FIG. 4C was discussed with respect to activating the horn system of the vehicles 402 and/or 422, the embodiments of this disclosure can include activation of any information system by any vehicle. For example, FIG. 4D is a block diagram depicting an example of a system 430 for communicating a signal generated based on an information system between two vehicles, according to some embodiments. The system 430 of FIG. 4D is provided as an example and does not limit the embodiments of this disclosure.

In this exemplary embodiment, the vehicle 402 does not activate its information system. However, the vehicle 422 activates its information system. In this example, the vehicle 401 may not have a visual line of sight of the vehicle 422 because of the vehicle 402. The vehicle 422 can activate a vehicle turn signal system, a vehicle brake system, and/or a vehicle blinker system, according to this exemplary embodiment.

In the exemplary embodiment of FIG. 4D, the vehicle 422 activates, automatically (e.g., using a driving system of the vehicle 422) or by a driver of the vehicle 422, a vehicle turn signal system. The signal generation and transmission systems 424 of the vehicle 422 can determine a direction of the turn of the vehicle 422 and generate signal 438. The signal generation and transmission systems 424 can transmit (e.g., broadcast signal 438). According to some examples, the signal generation and transmission systems 424 generate signal 438 to inform one or more vehicles (e.g., the vehicles 401 and/or 402) that the vehicle 422 is making a turn. Signal 438 can include at least one of a turning orientation of the vehicle 422, position information of the vehicle 422, speed information of the vehicle 422, acceleration information of the vehicle 422, and the like.

By analyzing the received signal 438, the signal analyzing system 407 of the vehicle 401 can determine that the vehicle 422 is making a turn. According to some examples, the signal analyzing system 407 can determine the direction of the turn of the vehicle 422 using the received signal 438. Additionally, the signal analyzing system 407 can use additional information in signal 438 and/or from the sensor system 409 to determine the direction of the turn of the vehicle 422. For example, the signal analyzing system 407 can determine the position of the vehicles 401 and/or 422 using, for example, high-precision map, determine the distance between the two vehicles, predict the vehicle 422 action (e.g., steering, turning, parking, etc.) The signal analyzing system 407 can generate an information signal for the driving system of the vehicle 401 to inform the driving system of the vehicle 401 that the vehicle 422 is making a turn. The driving system of the vehicle 401 can use the information for subsequent action. The subsequent actions can include, but are not limited to, slowing down the vehicle 401, maneuvering the vehicle 401 to pass the vehicle 402 and/or the vehicle 422, changing the lane that the vehicle 401 is traveling on (if possible), displaying a message to a driver of the vehicle 401 (if the vehicle 401 has a driver), and the like.

In addition to determining (e.g., predicting) the action(s) of the vehicle 422, the signal analysis system 407 of the vehicle 401 can be configured to determine (e.g., predict) the action(s) of the vehicle 402 based on, for example, signal 438 with (or without) additional information associated with the vehicle 422 and/or the vehicle 402. In this example, although vehicle 402 does not broadcast any signals, the vehicle 402 can be configured to determine (e.g., predict) the action(s) of the vehicle 402 when the vehicle 422 is making the turn. For example, based on additional information associated with the vehicle 402, the signal analysis system 407 of the vehicle 401 can be configured to determine (e.g., predict) that the vehicle 402 is slowing down in response to the vehicle 422 making the turn. The driving system of the vehicle 401 can use these additional information for its subsequent action.

As another example, the information system of the vehicle 422 that is activated can include a vehicle brake system. The signal generation and transmission system 424 of the vehicle 422 can determine, based on the indication from the vehicle brake system, that the vehicle 422 is activating the vehicle brake system (e.g., vehicle 422 is braking). The signal generation and transmission system 424 of the vehicle 422 can generate a signal to inform one or more vehicles (e.g., the vehicles 401 and/or 402) that the vehicle 422 is braking. In some embodiments, the generated signal can include at least one of position information of the vehicle 422, speed information of the vehicle 422, acceleration information of the vehicle 422, and the like.

When the vehicle 401 receives the signal, the signal analysis system 407 can determine, based on the received signal, that the vehicle 422 activated a brake system. The signal analysis system 407 can generate an information signal for a driving system of the vehicle 401 indicating that the vehicle 422 is braking. The driving system of the vehicle 401 can use the information for subsequent action. The subsequent actions can include, but are not limited to, slowing down the vehicle 401, maneuvering the vehicle 401 to pass the vehicles 402 and/or 422, changing the lane that the vehicle 401 is traveling on (if possible), displaying a message to a driver of the vehicle 401 (if the vehicle 401 has a driver), and the like.

In addition to determining (e.g., predicting) the action(s) of the vehicle 422, the signal analysis system 407 of the vehicle 401 can be configured to determine (e.g., predict) the action(s) of the vehicle 402 based on, for example, signal 438 with (or without) additional information associated with the vehicle 422 and/or the vehicle 402. In this example, although vehicle 402 does not broadcast any signals, the vehicle 402 can be configured to determine (e.g., predict) the action(s) of the vehicle 402 when the vehicle 422 is braking. For example, based on additional information associated with the vehicle 402, the signal analysis system 407 of the vehicle 401 can be configured to determine (e.g., predict) that the vehicle 402 is maneuvering the vehicle 422 in response to the vehicle 422 braking. The driving system of the vehicle 401 can use these additional information for its subsequent action.

Although some embodiments of this disclosure are discussed with respect to exemplary number of vehicles and exemplary information systems, it is noted that the embodiments of this disclosure are not limited to these examples. The embodiments of this disclosure can include any number of vehicles and any combination of different information systems.

FIG. 5A is a flowchart depicting an example method 500 for generating a signal based on the information of the information system and for transmitting/broadcasting the signal, according to some embodiments. For convenience, FIG. 5A will be described with references to FIGS. 1 and 2, but method 500 is not limited to the specific embodiments depicted in those figures and other systems may be used to perform the method as will be understood by those skilled in the arts. It is to be appreciated not all steps may be needed, and the steps may not be performed in the same order as shown in FIG. 5A.

According to some embodiments, method 500 begins at 501 when the signal generation system 205 of FIG. 2 receives an indication that an information system (e.g., the information system 203) of a vehicle, for example vehicle 102 of FIG. 1, is activated. Although some examples of an information system are discussed in this disclosure, embodiments of this disclosure are not limited to these exemplary information system. The signal generation system 205 of the vehicle 102 can be communicatively coupled to any system within the vehicle 102. The signal generation system 205 can receive information from the systems within the vehicle 102 and can generate a signal to be transmitted/broadcasted based on the received information. The received information can include any updated information from the systems within the vehicle 102, according to some embodiments. The information can be updated by at least one of a driver of the vehicle 102 or a driving system of the vehicle 102. For example, the information system 203 (or any other system within the vehicle 102) may be activated by a driver of the vehicle 102 and/or a driving system of the vehicle 102.

In 503, the signal generation system 205 generates a signal based on the activated information system 203 of the vehicle 102 and in response to receiving the indication from the activate information system 203. As discussed above, the signal generation system 205 may generate the signal based on any information from any system within the vehicle 102. The signal may include any information from any system within the vehicle 102. For example, when a system within the vehicle 102 updates its information in response to an action by the driver of the vehicle 102 and/or by the driving system of the vehicle 102, the signal generation system 205 generates the signal that includes information associated with the action of the driver or the driving system.

In 505, the signal generation system 205, alone or in combination with transceiver 209, transmits/broadcasts the generated signal. According to some embodiments, the signal generation system 205 and the transceiver 209 broadcast the generated signal so any receiver within the range of broadcast can receive the generated signal. Additionally or alternatively, the signal generation system 205 and the transceiver 209 can transmit the generated signal to one or more specific receiver by including, for example, the address(es) of the receiver(s) in the generated signal. According to some embodiments, the signal generation system 205 and the transceiver 209 can be configured to continuously generate and broadcast the signal. For example, the signal generation system 205 may continuously receive information from one or more systems within the vehicle, continuously generate the signal based on the received information, and continuously broadcast the generated signal. The one or more systems within the vehicle can include, but are not limited to, vehicle acceleration measurement system, vehicle speed measurement system, vehicle position measurement system, vehicle brake system, vehicle turn signal system, vehicle light system, vehicle blinker system, vehicle headlight system, vehicle horn system, vehicle sensor system, and the like.

FIG. 5B is a flowchart depicting an example method 520 for receiving and analyzing a signal generated based on information of an information system of another vehicle, according to some embodiments. For convenience, FIG. 5B will be described with references to FIGS. 1, 2, and 3, but method 520 is not limited to the specific embodiments depicted in those figures and other systems may be used to perform the method as will be understood by those skilled in the arts. It is to be appreciated not all steps may be needed, and the steps may not be performed in the same order as shown in FIG. 5B.

According to some embodiments, method 520 begins at 521 when the transceiver 303 of, for example, the vehicle 110 receives a signal from, for example, the vehicle 102. The received signal is based on an information system (e.g., information system 203) of the vehicle 102 that is activated. As discussed above, although some examples of an information system are discussed in this disclosure, the embodiments of this disclosure are not limited to these exemplary information system. The received signal can be based on, and include information associated with, any system within the vehicle 102.

At 523, the signal analysis stem 307 of the vehicle 110 analyzes the received signal. For example, the signal analysis stem 307 can be configured to generate analysis 313 based on the received signal. Additionally or alternatively, the signal analysis stem 307 generates analysis 313 based on the received signal and additional data and information from the sensor system 309.

At 525, the signal analysis system 307, alone or in combination with the controller 311, performs a subsequent action in response to the analysis of the received signal. Additionally or alternatively, the signal analysis system 307, alone or in combination with controller 311, determines a subsequent action in response to the received signal and generates a command for effecting the subsequent action. For example, the signal analysis system 307, determines the subsequent action in response to the received signal and generates, to the controller 311, the command for effecting the subsequent action. For example, the controller 311 may receive analysis 313 from the signal analysis system 307 and additional data and information from sensor system 309. The controller 311 may use the analysis 313 with (or without) the additional data and information to determine subsequent action(s). In some embodiments, the subsequent action can include converting the received signal to an information signal and delivering the information signal to a driver and/or a driving system of the vehicle 110.

Figure 5C:
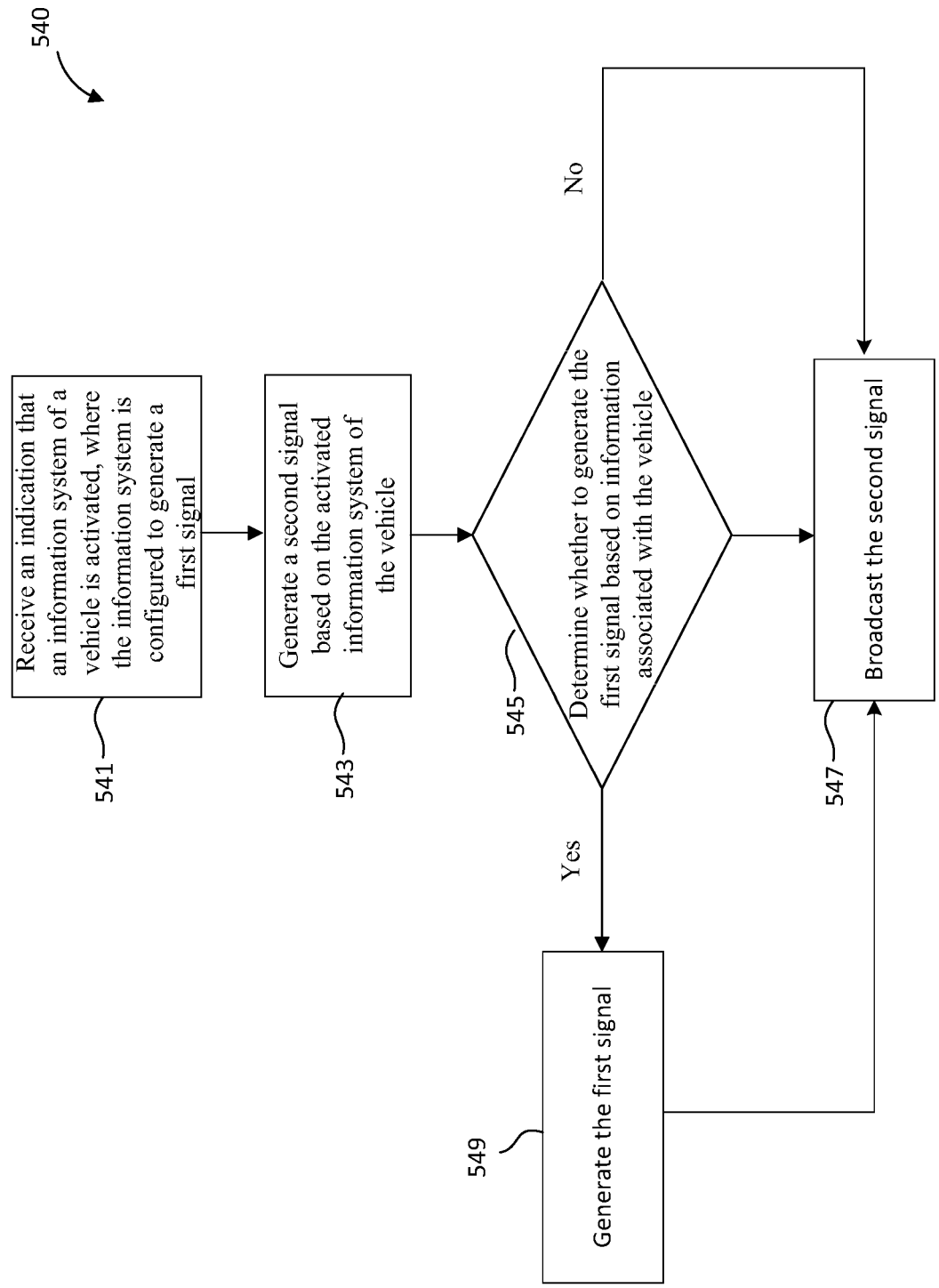
FIG. 5C is a flowchart depicting another example method for generating a signal based on the information of the information system and for transmitting/broadcasting the signal, according to some embodiments.

FIG. 5C is a flowchart depicting an example method 540 for generating a signal based on the information of the information system and for transmitting/broadcasting the signal, according to some embodiments. For convenience, FIG. 5C will be described with references to FIGS. 1 and 2, but method 540 is not limited to the specific embodiments depicted in those figures and other systems may be used to perform the method as will be understood by those skilled in the arts. It is to be appreciated not all steps may be needed, and the steps may not be performed in the same order as shown in FIG. 5C.

According to some embodiments, method 500 begins at 541 when the signal generation system 205 of FIG. 2 receives an indication that an information system (e.g., the information system 203) of a vehicle, for example vehicle 102 of FIG. 1, is activated. Although some examples of an information system are discussed in this disclosure, the embodiments of this disclosure are not limited to these exemplary information system. The signal generation system 205 of the vehicle 102 can be communicatively coupled to any system within the vehicle 102. The signal generation system 205 can receive information from the systems within the vehicle 102 and can generate a signal to be transmitted/broadcasted based on the received information. In some examples, the information system 203 can be configured to generate a first signal—for example, warning information (e.g., alert information/signal). According to some embodiments, although the information system 203 can be activated, the information system 203 may not generate the warning information (e.g., alert information/signal) 207.

In 543, the signal generation system 205 generates a second signal based on the activated information system 203 of the vehicle 102 and in response to receiving the indication from the activate information system 203. As discussed above, the signal generation system 205 may generate the second signal based on any information from any system within the vehicle 102. The second signal may include any information from any system within the vehicle 102. For example, when a system within the vehicle 102 updates its information in response to an action by the driver of the vehicle 102 and/or by the driving system of the vehicle 102, the signal generation system 205 generates the second signal that includes information associated with the action of the driver or the driving system.

In 545, the signal generation system 205 determines, when the information system 203 is activated, whether or not to generate the first signal—e.g., the warning information 207. In other words, there may be a plurality of ways to convey same information from the vehicle 102 to other vehicles and the signal generation system 205 can be configured to determine one or more ways to convey the information based on different conditions. For example, the signal generation system 205 can be configured to determine the one or more ways based on the information to be conveyed, the state information of the vehicle, the environment information, the information associated with the information system 203, a profile (e.g., preferences) of a driver of the vehicle, or the like.

If the signal generation system 205 determines not to generate the first signal, method 540 continues to 547. As a non-limiting example, when the vehicle horn system is activated, the information generation system 205 can use, for example, environment information to determine whether to generate both waning information 207 and the signal 210. In one example, the information generation system 205 determines, based on the environment information, it is night time and the vehicle is in a residential area. Therefore, in this example, the information generation system 205 determines not to generate the warning information 207 (e.g., the sound of the vehicle horn system) but generates the signal 210.

If the signal generation system 205 determines to generate the first signal, method 540 continues to 549, where the first signal is generated. According to some examples, the first signal is generated by the signal generation system 205 and/or information system 203. For example, the signal generation system 205 can request (e.g., send a signal to) information system 203 to generate the first signal—e.g., the warning information 207. Continuing with the non-limiting example of above, the information generation system 205 determines, based on the environment information, it is day time and the vehicle is in a crowded area. Therefore, in this example, the information generation system 205 determines to generate the warning information 207 (e.g., the sound of the vehicle horn system).

In 547, the signal generation system 205, alone or in combination with transceiver 209, transmits/broadcasts the generated signal.

Figure 6:
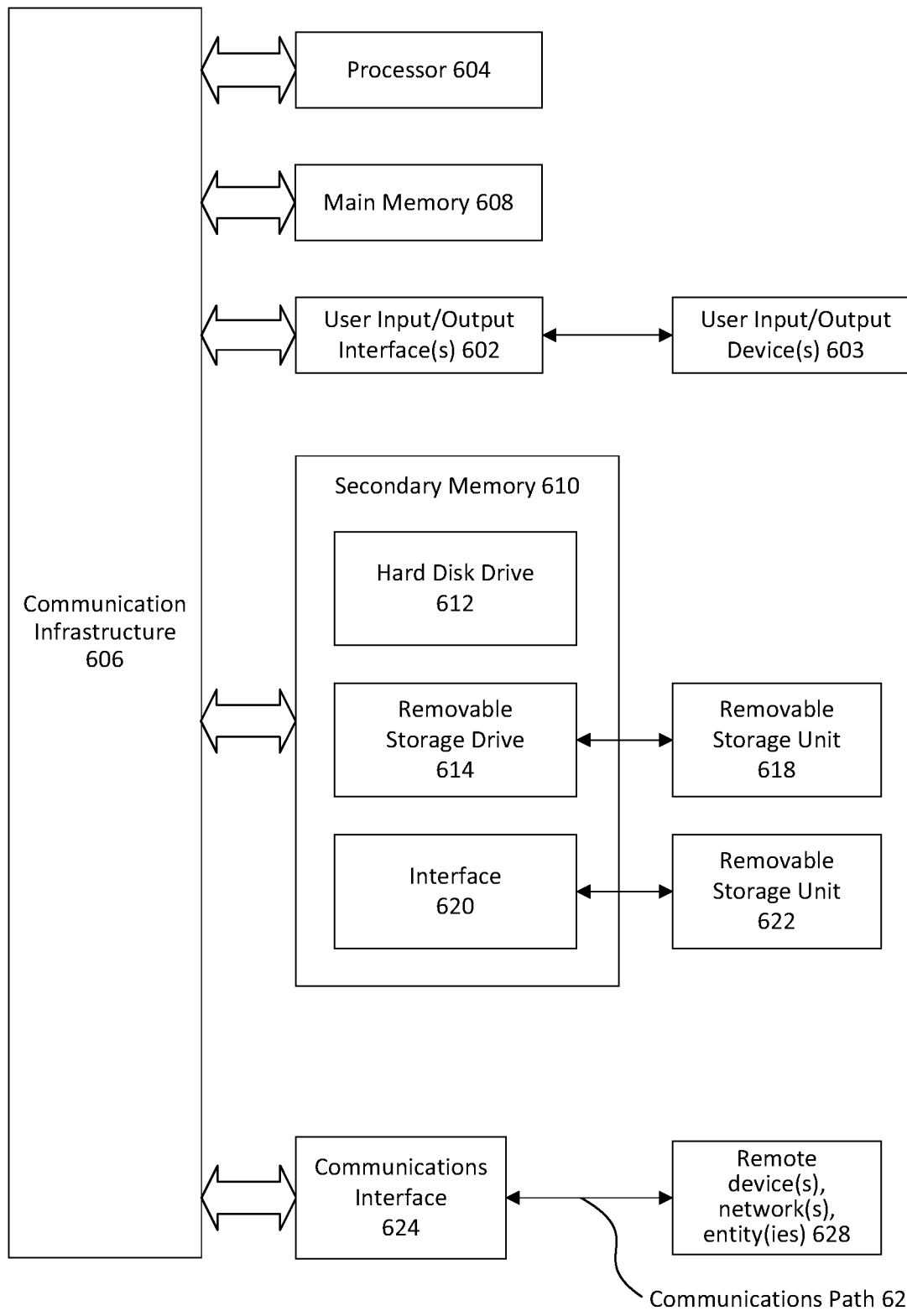
FIG. 6 is an example computer system useful for implementing some embodiments or portion(s) thereof.

Various embodiments can be implemented, for example, using one or more well-known computer systems, such as computer system 600 shown in FIG. 6. For instance, each of the components and/or operations described with reference to FIGS. 1, 2, 3, 4A-4D, 5A, and 5B could be implemented using one or more computer systems 600 or portions thereof. Computer system 600 can be used, for example, to implement method 500 of FIG. 5A or method 520 of FIG. 5B. For example, computer system 600 can be used for generating, transmitting, receiving, and analyzing signals, according to some embodiments. The computer system 600 can be any computer capable of performing the functions described herein.

The computer system 600 includes one or more processors (also called central processing units, or CPUs), such as a processor 604. The processor 606 is connected to a communication infrastructure or bus 606.

The processor 606 may be, for example, a graphics processing unit (GPU). In some embodiments, the GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 600 also includes user input/output/display device(s) 622, such as monitors, keyboards, pointing devices, etc., that communicate with communication infrastructure 604.

The computer system 600 also includes a main or primary memory 608, such as random access memory (RAM). The main memory 608 may include one or more levels of cache. The main memory 608 has stored therein control logic 628 (e.g., computer software) and/or data.

The computer system 600 may also include one or more secondary storage devices or memory 610. The secondary memory 610 may include, for example, a hard disk drive 612 and/or a removable storage device or drive 614. The removable storage drive 614 may be a floppy disk drive, a magnetic tape drive, a compact disk drive, an optical storage device, tape backup device, and/or any other storage device/drive.

The removable storage drive 614 may interact with a removable storage unit 618.

The removable storage unit 618 includes a computer usable or readable storage device having stored therein control logic (e.g., computer software) and/or data. The removable storage unit 618 may be a floppy disk, magnetic tape, compact disk, DVD, optical storage disk, and/ any other computer data storage device. The removable storage drive 614 reads from and/or writes to the removable storage unit.

The computer system 600 may further include a communication or network interface 618. The communication interface 618 enables the computer system 600 to communicate and interact with any combination of remote devices, remote networks, remote entities, etc. (individually and collectively referenced by reference number). For example, communication interface 618 may allow the computer system 600 to communicate with remote devices over a communications path 626, which may be wired and/or wireless, and which may include any combination of LANs, WANs, the Internet, etc. Control logic and/or data may be transmitted to and from computer system 600 via communication path 626.

In some embodiments, a tangible apparatus or article of manufacture including a tangible computer useable or readable medium having control logic (software) stored thereon is also referred to herein as a "computer program product" or "program storage device." This includes, but is not limited to, the computer system 600, the main memory 608, the secondary memory 610, and the removable storage unit, as well as tangible articles of manufacture embodying any combination of the foregoing. Such control logic, when executed by one or more data processing devices (such as the computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure so that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

The claims in the instant application are different than those of any parent application or other related applications. The Applicant therefore rescinds any disclaimer of claim scope made in the parent application or any predecessor or related application in relation to the instant application. The Examiner is therefore advised that any such previous disclaimer and the cited references that it was made to avoid, may need to be revisited. Further, the Examiner is also reminded that any disclaimer made in the instant application should not be read into or against the parent or related application(s).

What is claimed is:

1. A method, comprising:
   receiving, at a first vehicle, a signal from a second vehicle, wherein the signal is based on an information system of the second vehicle that is activated to generate an alert signal, wherein the received signal and the alert signal are generated based on the activation of the information system of the second vehicle, and wherein the received signal is different than the alert signal;
   analyzing, at the first vehicle, the received signal to determine a subsequent action in response to the received signal; and
   generating a command for effecting the subsequent action.

2. The method of claim 1, wherein the information system of the second vehicle is activated by at least one of a driver of the second vehicle or a driving system of the second vehicle and wherein the signal comprises information associated with an action of the at least one of the driver of the second vehicle or the driving system of the second vehicle.

3. The method of claim 1, further comprising:
   receiving, at the first vehicle, the alert signal from the second vehicle.

4. The method of claim 1, wherein the subsequent action comprises:
   converting the received signal to an information signal; and
   delivering the information signal to a driving system of the first vehicle.

5. The method of claim 1, further comprising:
   determining position information of the second vehicle;
   determining speed information of the second vehicle; and
   using the determined position information and the determined speed information in analyzing the received signal to determine the subsequent action.

6. The method of claim 5, further comprising:
   using one or more sensors of the first vehicle to determine the position information and the speed information of the second vehicle.

7. The method of claim 5, further comprising:
   analyzing the received signal to determine the position information and the speed information of the second vehicle.

8. The method of claim 1, wherein the received signal includes information associated with the second vehicle, and analyzing the received signal comprises:
   determining the information associated with the second vehicle; and
   using the determined information in the determining the subsequent action.

9. The method of claim 8, wherein the information associated with the second vehicle comprises at least one of speed information associated with the second vehicle, position information associated with the second vehicle, acceleration information associated with the second vehicle, or an identification of the second vehicle.

10. The method of claim 9, wherein the position information of the second vehicle comprises at least one of a longitude, a latitude, or a height associated with the second vehicle and the method further comprising:
    determining a location of the second vehicle using the position information of the second vehicle and a high-precision map.

11. The method of claim 1, wherein the received signal includes information associated with a surrounding environment of the second vehicle, and analyzing the received signal comprises:
    determining the information associated with the surrounding environment of the second vehicle; and
    using the determined information in the determining the subsequent action.

12. The method of claim 1, wherein the first vehicle is an autonomous vehicle.

13. The method of claim 1, further comprising:
    using the received signal with information associated with the first vehicle to determine the subsequent action to be performed by the first vehicle,
    wherein the information associated with the first vehicle is determined using one or more sensors of the first vehicle.

14. The method of claim 1, further comprising:
    receiving, at the first vehicle, the alert signal from the second vehicle, wherein the alert signal comprises an audio signal; and
    determining at least position information or speed information between the first and second vehicles using the signal and the alert signal.

15. The method of claim 1, wherein the information system of the second vehicle is activated by at least one of a driver of the second vehicle or a driving system of the second vehicle and wherein the signal indicates an intention of the driver of the second vehicle or the driving system of the second vehicle for activating the information system.

16. The method of claim 1, wherein the alert signal is a human recognizable signal, and wherein the signal generated based on the activated information system is not a human recognizable signal.

17. A non-transitory computer program product comprising machine readable instructions for causing a programmable processing device to perform operations comprising:
    receiving a signal from a second vehicle, wherein the signal is based on an information system of the second vehicle that is activated to generate an alert signal, wherein the received signal and the alert signal are generated based on the activation of the information system of the second vehicle and wherein the received signal is different than the alert signal;
    analyzing the received signal to determine a subsequent action in response to the received signal; and
    generating a command for effecting the subsequent action.

18. The non-transitory computer program product of claim 17, the operations further comprising:
    determining position information of the second vehicle;
    determining speed information of the second vehicle; and using the determined position information and the determined speed information in analyzing the received signal to determine the subsequent action.

19. An information processing system, mounted in a first vehicle, comprising:
  a transceiver configured to receive a signal from a second vehicle, wherein the signal is based on an information system of the second vehicle that is activated to generate an alert signal, wherein the received signal and the alert signal are generated based on the activation of the information system of the second vehicle and wherein the received signal is different than the alert signal; and
  one or more processors, upon executing instructions, individually or collectively, configured to:
    analyze the received signal to determine a subsequent action in response to the received signal; and
    generating a command for effecting the subsequent action of the first vehicle.

20. The system of claim 19, wherein the one or more processors are further configured to:
  determine position information of the second vehicle;
  determine speed information of the second vehicle; and
  use the determined position information and the determined speed information in analyzing the received signal to determine the subsequent action.

* * * * *